United States Patent
Ishiyama et al.

(10) Patent No.: US 10,567,590 B2
(45) Date of Patent: *Feb. 18, 2020

(54) APPARATUS, SYSTEM, AND METHOD OF CONFERENCE ASSISTANCE

(71) Applicants: Yorichika Ishiyama, Kanagawa (JP); Hiroyuki Kimbara, Kanagawa (JP); Masaaki Kagawa, Tokyo (JP); Jun Murata, Tokyo (JP); Takahiro Yamamoto, Kanagawa (JP)

(72) Inventors: Yorichika Ishiyama, Kanagawa (JP); Hiroyuki Kimbara, Kanagawa (JP); Masaaki Kagawa, Tokyo (JP); Jun Murata, Tokyo (JP); Takahiro Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,406

(22) Filed: Jun. 18, 2019

(65) Prior Publication Data

US 2019/0306321 A1  Oct. 3, 2019

Related U.S. Application Data

(63) Continuation of application No. 16/192,983, filed on Nov. 16, 2018, now Pat. No. 10,367,944, which is a (Continued)

(30) Foreign Application Priority Data

Aug. 31, 2016  (JP) .................... 2016-169663

(51) Int. Cl.
*H04M 3/56* (2006.01)
*G10L 15/26* (2006.01)
(Continued)

(52) U.S. Cl.
CPC ............ *H04M 3/567* (2013.01); *G06F 9/453* (2018.02); *G06F 21/6245* (2013.01);
(Continued)

(58) Field of Classification Search
CPC .... G06F 9/4446; G06F 9/453; G06F 21/6245; G06N 20/00; G06N 99/005; G10L 15/26;
(Continued)

(56) References Cited

U.S. PATENT DOCUMENTS 10,194,031 B2 * 1/2019 Ishiyama ................ G06F 9/453
2011/0270609 A1  11/2011 Jones et al.
(Continued)

FOREIGN PATENT DOCUMENTS

JP  2012048610 A  3/2012

*Primary Examiner* — Harry S Hong
(74) *Attorney, Agent, or Firm* — Harness, Dickey and Pierce, P.L.C.

(57) ABSTRACT

A conference assistance system and method for assisting a user in utilizing conference-related information, each of which: receives input of voice or writing of at least one meeting participant; determines whether text data representing the received voice or writing is to be used by the conference assistance system to generate assistance information, to generate a determination result; when the determination result indicates that the text data is to be used, generates, based on the text data, assistance information for assisting the meeting participant; and controls a display to display the generated assistance information.

20 Claims, 21 Drawing Sheets

Related U.S. Application Data continuation of application No. 15/670,130, filed on Aug. 7, 2017, now Pat. No. 10,194,031.

(51) Int. Cl.
| | |
|---|---|
| *G06F 9/44* | (2018.01) |
| *G06N 99/00* | (2019.01) |
| *G06F 21/62* | (2013.01) |
| *G06N 20/00* | (2019.01) |
| *H04M 3/42* | (2006.01) |
| *G06F 9/451* | (2018.01) |
| *H04M 7/00* | (2006.01) |

(52) U.S. Cl.
CPC ............ *G06N 20/00* (2019.01); *G10L 15/265* (2013.01); *H04M 3/42382* (2013.01); *H04M 7/0027* (2013.01); *G10L 15/26* (2013.01); *H04M 2203/609* (2013.01); *H04M 2203/6009* (2013.01)

(58) Field of Classification Search
CPC . G10L 15/265; H04M 3/42382; H04M 3/567; H04M 7/0027; H04M 2203/6009; H04M 2203/609
USPC ..................................... 379/202.01
See application file for complete search history.

(56) References Cited

U.S. PATENT DOCUMENTS

| | | |
|---|---|---|
| 2012/0050197 A1 | 3/2012 | Kemmochi |
| 2016/0344867 A1 | 11/2016 | Krishnaswamy et al. |
| 2017/0134446 A1 | 5/2017 | Kitada et al. |
| 2018/0063332 A1 | 3/2018 | Ishiyama et al. |
| 2019/0089838 A1* | 3/2019 | Ishiyama ................ G06F 9/453 |

\* cited by examiner

| USER ID | NAME | APPOINTMENT | ... |
|---|---|---|---|
| user001 | TARO YAMADA | N/A | ... |
| user002 | HANAKO SUZUKI | DEPARTMENT MANAGER | ... |
| user003 | JIRO TANAKA | DIVISION CHIEF | ... |
| ⋮ | ⋮ | ⋮ | ⋮ |

| CONFIDENTIAL WORD | SIMILAR WORD |
|---|---|
| LAWSUIT | TRIAL, SENTENCE, SUIT, ⋯ |
| MANAGEMENT PLANNING | MANAGEMENT STRATEGY, BUSINESS PLANNING, BUSINESS STRATEGY, ⋯ |
| PATENT | INTELLECTUAL PROPERTY, DESIGN PATENT, TRADEMARK, ⋯ |
| ⋮ | ⋮ |

114

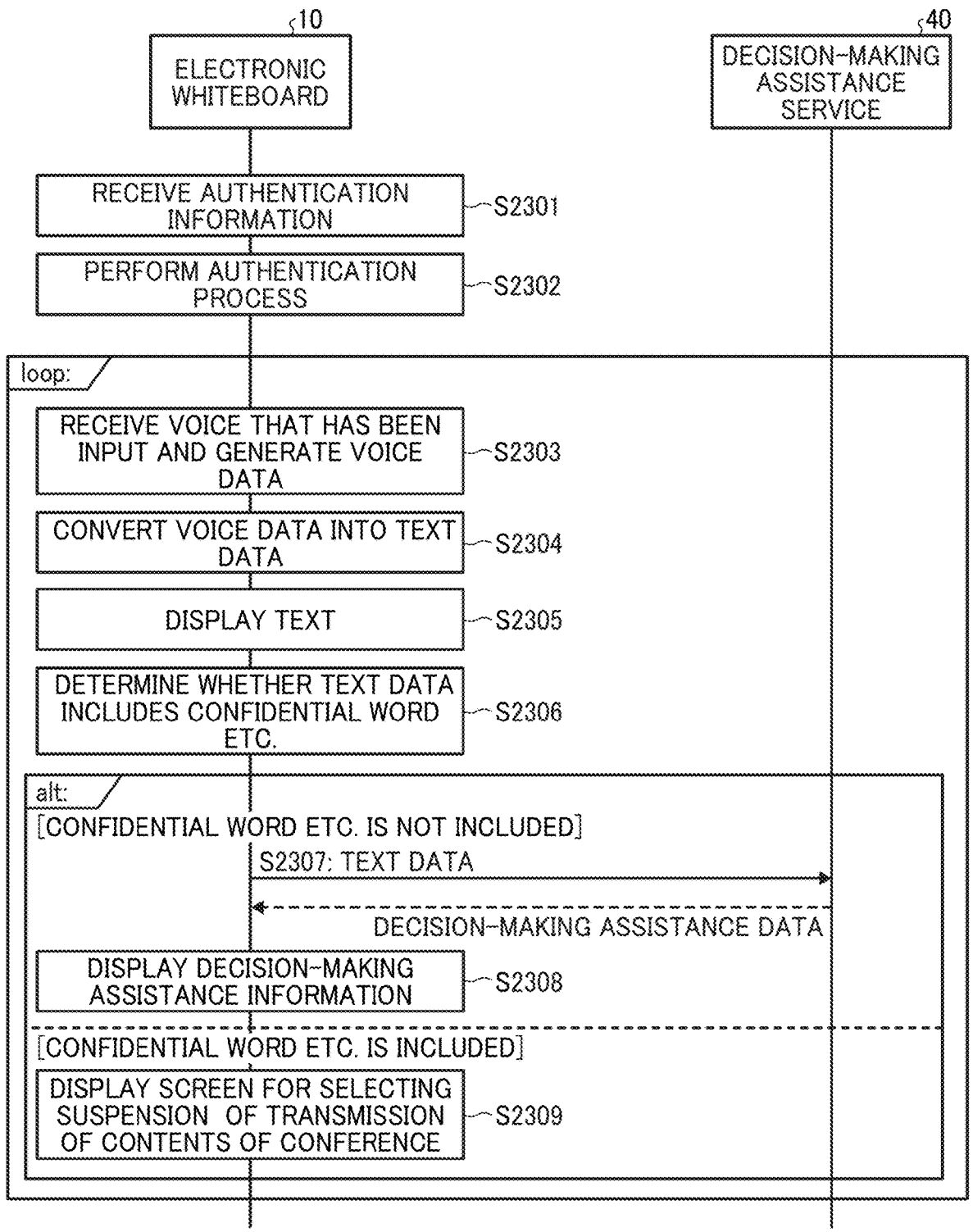

APPARATUS, SYSTEM, AND METHOD OF CONFERENCE ASSISTANCE

CROSS-REFERENCE TO RELATED APPLICATIONS

This application is a continuation application of U.S. application Ser. No. 16/192,983, filed on Nov. 16, 2018, which is a continuation application of U.S. application Ser. No. 15/670,130, filed Aug. 7, 2017, which claims priority pursuant to 35 U.S.C. § 119(a) to Japanese Patent Application No. 2016-169663, filed on Aug. 31, 2016, in the Japan Patent Office, the entire disclosure of each of which is hereby incorporated by reference herein.

BACKGROUND

Technical Field

The present invention relates to an apparatus, system, and method of conference assistance.

Description of the Related Art

Conference assistance systems for assisting a user at a conference are known. Such conference assistance systems may be used, for example, to improve effectiveness of organization management, operation planning, and decision-making of a committee or the like.

Further, at the conference, electronic whiteboards are often used by a meeting participant, to input user's statements. For example, handwritten characters and the like can be input to the electronic whiteboard with an electronic pen or a user's finger on a touch panel. Further, the user's voices may be input to the electronic whiteboard. That is, the electronic whiteboard may be used to record contents of discussion or a meeting agenda at the conference.

SUMMARY

Embodiments of the present invention include a conference assistance system and method for assisting a user in utilizing conference-related information, each of which: receives input of voice or writing of at least one meeting participant; determines whether text data representing the received voice or writing is to be used by the conference assistance system to generate assistance information, to generate a determination result; when the determination result indicates that the text data is to be used, generates, based on the text data, assistance information for assisting the meeting participant; and controls a display to display the generated assistance information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 21 is an illustration of exemplary confidential-word information;

FIG. 23 is a sequence diagram illustrating an exemplary process of inputting voice according to the fourth embodiment.

Figure 1:
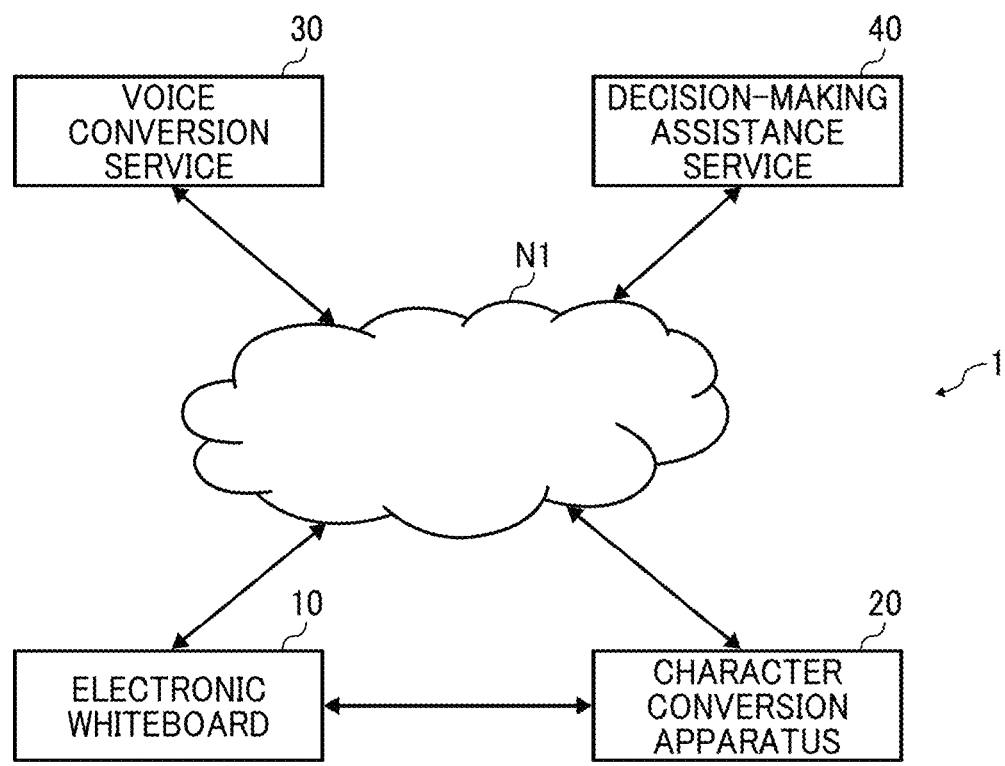
FIG. 1 is a diagram illustrating a system configuration of a conference assistance system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Now, embodiments of the present invention will be described in detail with reference to the drawings.

<System Configuration>

First, a configuration of a conference assistance system 1 according to a first embodiment will be described with reference to FIG. 1. FIG. 1 illustrates an exemplary system configuration of the conference assistance system 1 according to this embodiment.

As illustrated in FIG. 1, the conference assistance system 1 according to this embodiment includes an electronic whiteboard 10 and a character conversion apparatus 20. In this embodiment, the electronic whiteboard 10 and the character conversion apparatus 20 are provided at a user site. The conference assistance system 1 further includes a voice conversion service 30 and a decision-making assistance service 40, which are connected to the electronic whiteboard 10 and the character conversion apparatus 20 via a wide-area network N1, such as the Internet, in such a manner that the services 30 and 40 can communicate with the voice conversion service 30 and the decision-making assistance service 40.

The electronic whiteboard 10 is used at, for example, a conference, a classroom, or the like and can display data of an electronic file or the like on a display and enables input of characters that are handwritten with a user's hand, an electronic pen, etc. and collecting (input) of voice with a microphone, for example. Such an electronic whiteboard 10 is also referred to as an interactive whiteboard (IWB).

In addition, the electronic whiteboard 10 displays, on the display, various kinds of information (i.e., various kinds of information for assisting decision-making of a committee at a conference that uses the electronic whiteboard 10, for example) provided from the decision-making assistance service 40.

The character conversion apparatus 20 is an information processing apparatus that converts data representing handwritten characters (handwritten-character data) that have been input to the electronic whiteboard 10 into text data by using, for example, the character recognition technology or the like.

Note that the electronic whiteboard 10 and the character conversion apparatus 20 are connected to each other so as to be capable of communicating with each other through a network such as a local area network (LAN) at an office. However, the electronic whiteboard 10 and the character conversion apparatus 20 may be connected to each other so as to communicate with each other through the network N1, for example.

In this embodiment, the voice conversion service 30 is an external system or apparatus, functioning as a server, that provides a service for converting data representing voice (voice data) that has been input to the electronic whiteboard 10 into text data by using, for example, the voice recognition technology or the like.

The decision-making assistance service 40 is an external system or apparatus, functioning as a server, that provides a service for assisting decision-making of a user by using, for example, the artificial intelligence (AI) technology, an intelligent agent (IA), or the like. That is, based on text data that has been received from the character conversion apparatus 20, the voice conversion service 30, or the like, the decision-making assistance service 40 provides various kinds of information for assisting, for example, decision-making of a committee to the electronic whiteboard 10.

Note that the voice conversion service 30 and the decision-making assistance service 40 are each an external cloud service in this embodiment. However, the voice conversion service 30 and the decision-making assistance service 40 are not limited to this example and may be, for example, a service provided by an application service provider (ASP), a web service, or the like.

In addition, the conference assistance system 1 illustrated in FIG. 1 is an example and may have another configuration. For example, the character conversion apparatus 20 may be included in the electronic whiteboard 10. In this case, the electronic whiteboard 10 converts handwritten-character data into text data. In addition, for example, the voice conversion service 30 may be included in the conference assistance system 1, or the character conversion apparatus 20 may be an external apparatus that provides a cloud character-conversion service.

<Hardware Configuration>

Figure 2:
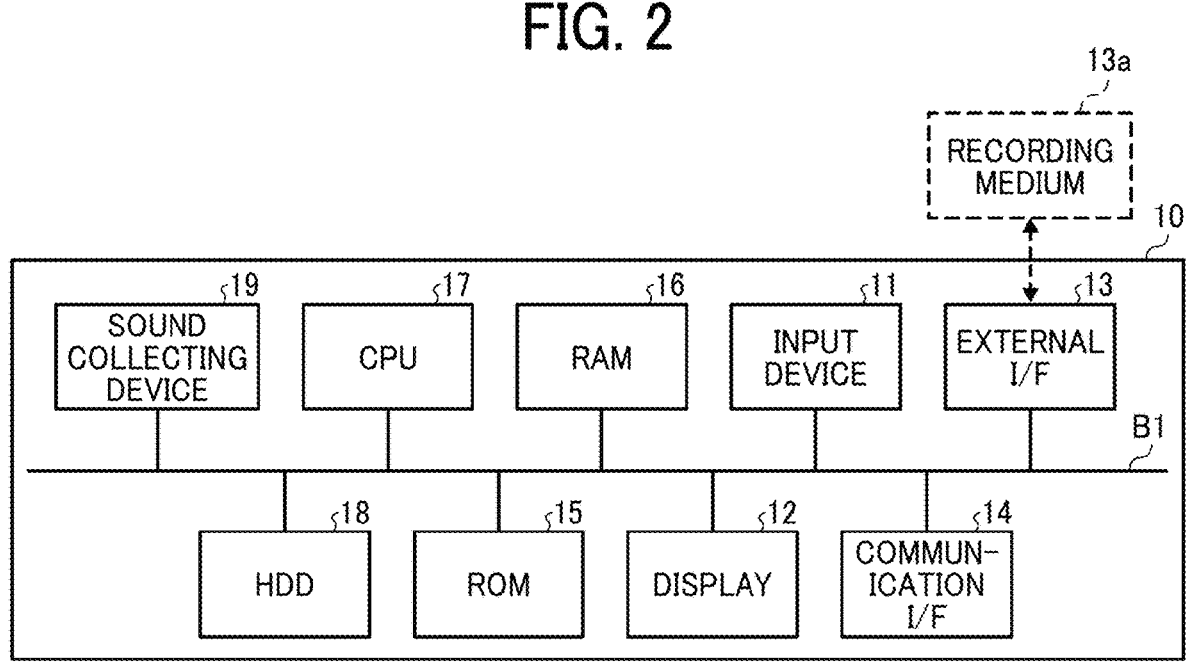
FIG. 2 is a diagram illustrating a hardware configuration of an electronic whiteboard according to the first embodiment.

Next, a hardware configuration of the electronic whiteboard 10 according to this embodiment will be described with reference to FIG. 2. FIG. 2 illustrates an exemplary hardware configuration of the electronic whiteboard 10 according to this embodiment.

As illustrated in FIG. 2, the electronic whiteboard 10 according to this embodiment includes an input device 11, a display 12, an external interface (I/F) 13, a communication I/F 14, and a read only memory (ROM) 15. The electronic whiteboard 10 according to this embodiment further includes a random access memory (RAM) 16, a central processing unit (CPU) 17, a hard disk drive (HDD) 18, and a sound collecting device 19. These hardware components are connected to one another via a bus B1.

The input device 11 is a touch panel or the like and is used to input a variety of user operations (e.g., operation of inputting handwritten characters). The display 12 is a display device or the like and displays various kinds of information (e.g., handwritten characters, various texts, and various icons). When the display 12 is provided externally, the display 12 is connected to the electronic whiteboard 10 via a cable, for example.

The external I/F 13 is an interface to an external device. An example of the external device is a recording medium 13a. Thus, the electronic whiteboard 10 can read or write data from or to the recording medium 13a or the like via the external I/F 13. Examples of the recording medium 13a include a universal serial bus (USB) memory, a compact disc (CD), a digital versatile disc (DVD), a secure digital (SD) memory card, and the like.

The communication I/F 14 is an interface used to connect the electronic whiteboard 10 to the network N1 or the like. Thus, the electronic whiteboard 10 can communicate with another apparatus (e.g., the character conversion apparatus 20 or the voice conversion service 30) via the communication I/F 14.

The HDD 18 is a nonvolatile memory device that stores programs and data. The programs and data stored in the HDD 18 are an operating system (OS), which is basic software that controls the whole electronic whiteboard 10, an application program that provides a variety of functions on the OS, and the like.

The HDD 18 manages the stored programs and data by using file systems and/or databases (DB). Note that the electronic whiteboard 10 may include a driving device (e.g., solid state drive (SSD)) using a flash memory as a memory medium instead of the HDD 18.

The ROM 15 is a nonvolatile semiconductor memory that is capable of retaining programs and data even if the power is turned off. The programs and data stored in the ROM 15 are a basic input/output system (BIOS) executed when starting the electronic whiteboard 10, an OS setting, a network setting, and the like. The RAM 16 is a volatile semiconductor memory that temporarily retains the programs and data.

The CPU 17 is a processing device that controls the whole electronic whiteboard 10 and that implements functions thereof by reading programs and data to the RAM 16 from memory devices such as the ROM 15 and the HDD 18 and by performing processes.

The sound collecting device 19 is a microphone, for example, and collects sound around the electronic whiteboard 10.

The electronic whiteboard 10 according to this embodiment can perform various processes, which will be described later, by having the hardware configuration illustrated in FIG. 2.

Figure 3:
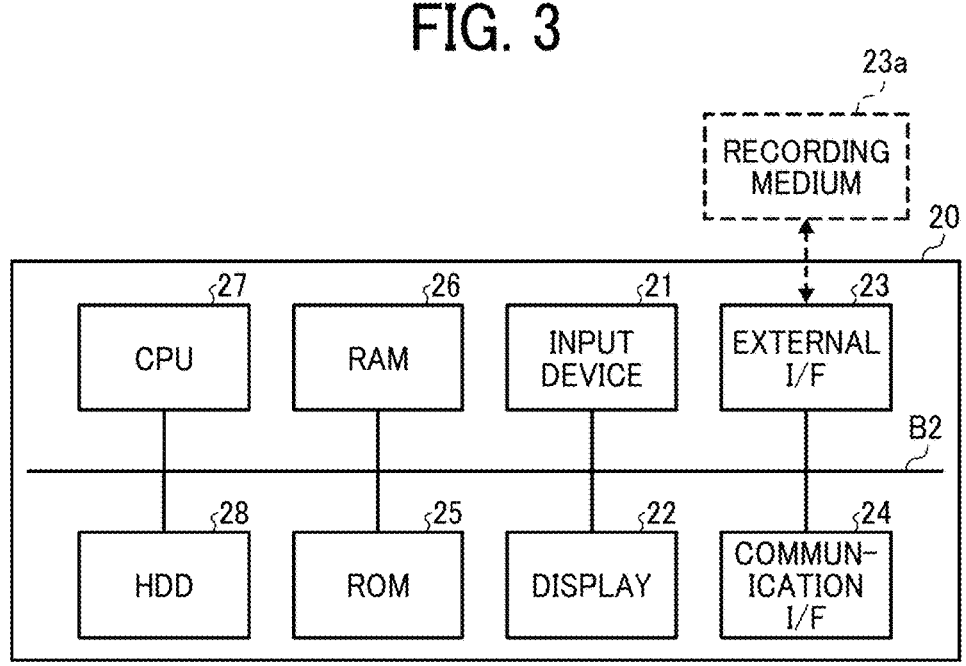
FIG. 3 is a diagram illustrating a hardware configuration of a character conversion apparatus according to the first embodiment.

Next, a hardware configuration of the character conversion apparatus 20 according to this embodiment will be described with reference to FIG. 3. FIG. 3 illustrates an exemplary hardware configuration of the character conversion apparatus 20 according to this embodiment.

As illustrated in FIG. 3, the character conversion apparatus 20 according to this embodiment includes an input device 21, a display 22, an external I/F 23, and a communication I/F 24. The character conversion apparatus 20 according to this embodiment further includes a ROM 25, a RAM 26, a CPU 27, and an HDD 28. These hardware components are connected to one another via a bus B2.

The input device 21 is a keyboard, a mouse, a touch panel, or the like and is used to input a variety of user operations. The display 22 is a display device or the like and displays various kinds of information. Note that the character conversion apparatus 20 may establish a connection between at least one of the input device 21 and the display 22 and the bus B2, as needed.

The external I/F 23 is an interface to an external device. An example of the external device is a recording medium 23a. Thus, the character conversion apparatus 20 can read or write data from or to the recording medium 23a or the like via the external I/F 23. Examples of the recording medium 23a include a USB memory, a CD, a DVD, an SD memory card, and the like.

The communication I/F 24 is an interface used to connect the character conversion apparatus 20 to the network N1 or the like. Thus, the character conversion apparatus 20 can communicate with another apparatus (e.g., the electronic whiteboard 10 or the decision-making assistance service 40) via the communication I/F 24.

The HDD 28 is a nonvolatile memory device that stores programs and data. The programs and data stored in the HDD 28 are an OS, which is basic software that controls the whole character conversion apparatus 20, an application program that provides a variety of functions on the OS, and the like.

The HDD 28 manages the stored programs and data by using predetermined file systems and/or databases (DB). Note that the character conversion apparatus 20 may include a driving device (e.g., solid state drive (SSD)) using a flash memory as a memory medium instead of the HDD 28.

The ROM 25 is a nonvolatile semiconductor memory that is capable of retaining programs and data even if the power is turned off. The programs and data stored in the ROM 25 are, for example, a BIOS executed when starting the character conversion apparatus 20, an OS setting, a network setting, and the like. The RAM 26 is a volatile semiconductor memory that temporarily retains programs and data.

The CPU 27 is a processing device that controls the whole character conversion apparatus 20 and that implements functions thereof by reading programs and data to the RAM 26 from memory devices such as the ROM 25 and the HDD 28 and by performing processes.

The character conversion apparatus 20 according to this embodiment can perform various processes, which will be described later, by having the hardware configuration illustrated in FIG. 3.

<Functional Configuration>

Figure 4:
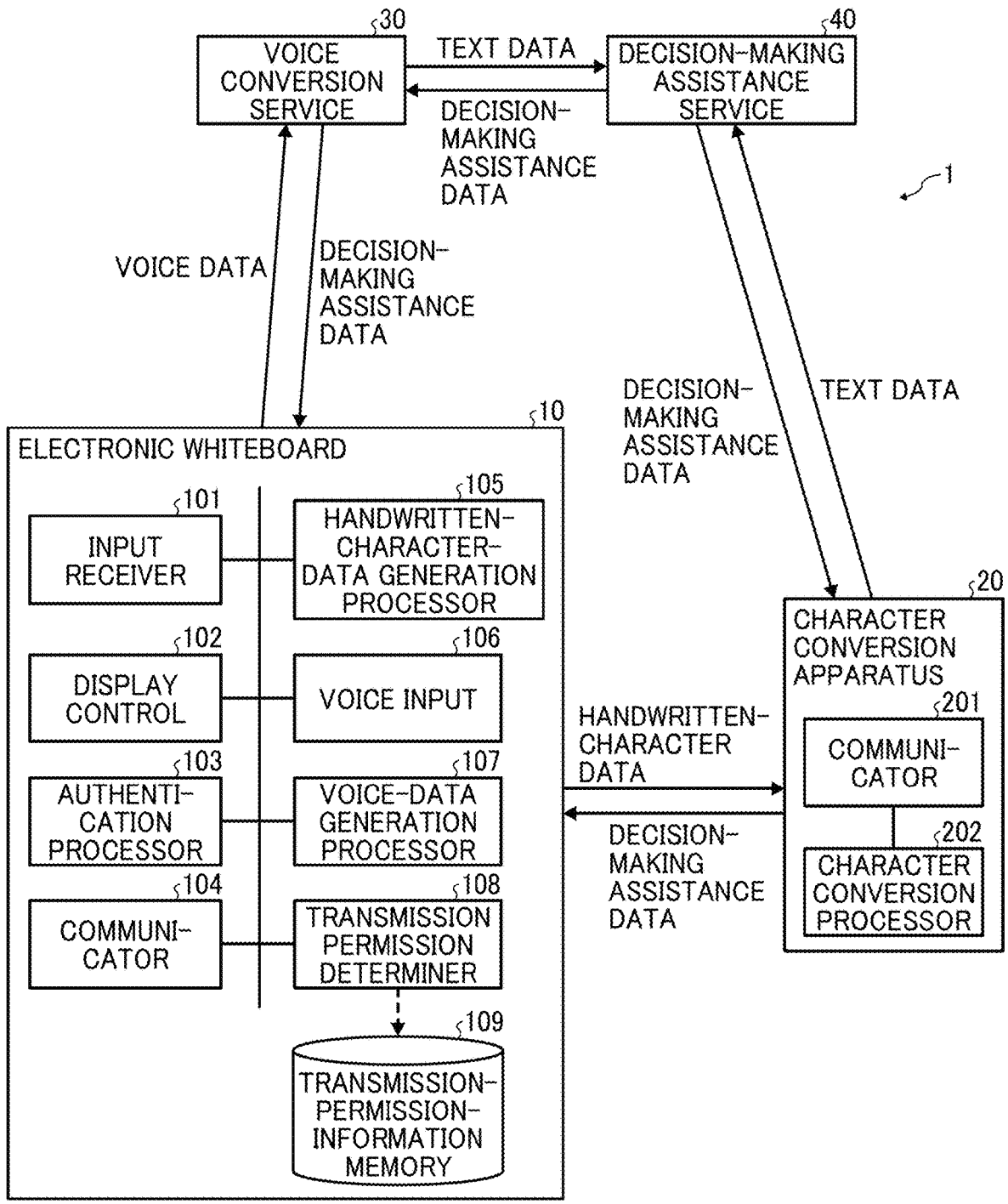
FIG. 4 is a diagram illustrating an exemplary functional configuration of the conference assistance system according to the first embodiment.

Next, a functional configuration of the conference assistance system 1 according to this embodiment will be described with reference to FIG. 4. FIG. 4 is a diagram illustrating an exemplary functional configuration of the conference assistance system 1 according to this embodiment.

As illustrated in FIG. 4, the electronic whiteboard 10 according to this embodiment includes an input receiver 101, a display control 102, an authentication processor 103, a communicator 104, a handwritten-character-data generation processor 105, a voice input 106, a voice-data generation processor 107, and a transmission permission determiner 108. Each of these functional units is implemented by the CPU 17 performing processes in accordance with one or more programs installed in the electronic whiteboard 10.

The electronic whiteboard 10 according to this embodiment further includes a transmission-permission-information memory 109. This memory can be implemented by using, for example, the HDD 18. Note that the memory may be implemented by using a memory device or the like connected to the electronic whiteboard 10 via a network.

The input receiver 101 receives inputs of a variety of operations performed by a user. That is, the input receiver 101 receives inputs of an operation of inputting handwritten characters, various selection operations, and the like performed by a user. In addition, the input receiver 101 receives an operation of inputting authentication information for a user to start using the electronic whiteboard 10.

The display control 102 displays various kinds of information. That is, the display control 102 displays handwritten characters, a variety of screens, and the like. The display control 102 also displays texts represented by text data obtained through conversion performed by the voice conversion service 30. The display control 102 further displays decision-making assisting information represented by decision-making assistance data transmitted from the decision-making assistance service 40.

The authentication processor 103 performs authentication based on authentication information whose input has been received by the input receiver 101. That is, the authentication processor 103 performs an authentication process by, for example, determining whether a combination of a user ID and a password (authentication information) whose input has been received by the input receiver 101 corresponds to a combination of a user ID and a password that is previously registered.

The communicator 104 communicates various kinds of data with another apparatus (e.g., the character conversion apparatus 20 or the voice conversion service 30). That is, the communicator 104 transmits, for example, handwritten-character data generated by the handwritten-character-data generation processor 105 to the character conversion apparatus 20. Thus, the electronic whiteboard 10 can convert the handwritten-character data into text data by using the character conversion apparatus 20 and can transmit the text data to the decision-making assistance service 40.

The communicator 104 transmits, for example, voice data generated by the voice-data generation processor 107 to the voice conversion service 30. Thus, the electronic whiteboard 10 can convert the voice data into text data by using the voice conversion service 30 and can transmit the text data to the decision-making assistance service 40.

Further, the communicator 104 receives decision-making assistance data from the decision-making assistance service 40 via the character conversion apparatus 20 or the voice conversion service 30. Note that the decision-making assistance data is data representing information for assisting decision-making (e.g., information presenting a solution, an alternative, or the like for an issue of an agenda of a committee).

Upon an operation of inputting a handwritten character being received by the input receiver 101, the handwritten-character-data generation processor 105 generates data representing the handwritten character (handwritten-character data). In addition, in accordance with the result of the determination performed by the transmission permission determiner 108, the handwritten-character-data generation processor 105 transmits the generated handwritten-character data to the character conversion apparatus 20 via the communicator 104.

The voice input 106 inputs voice. That is, the voice input 106 inputs sound (voice) collected by the sound collecting device 19.

The voice-data generation processor 107 generates data representing voice (voice data) that has been input by the voice input 106. In addition, in accordance with the result of the determination performed by the transmission permission determiner 108, the voice-data generation processor 107 transmits the generated voice data to the voice conversion service 30 via the communicator 104.

Referring to transmission-permission information stored in the transmission-permission-information memory 109, the transmission permission determiner 108 determines, for example, whether contents of a conference (i.e., handwritten-character data and voice data) are to be transmitted to the character conversion apparatus 20 and the voice conversion service 30.

In the transmission-permission information, as will be described later, a user ID of a user who uses the electronic whiteboard 10 and information for determining whether transmission is permitted (e.g., appointment or the like of the user) are associated with each other. Accordingly, the transmission permission determiner 108 determines whether transmission of the handwritten-character data and the voice data is permitted in accordance with, for example, the appointment or the like associated with the user ID of the user who has been authenticated by the authentication processor 103.

The transmission-permission-information memory 109 stores the transmission-permission information that is used by the transmission permission determiner 108 to determine whether transmission of the handwritten-character data and the voice data is permitted. Note that details of the transmission-permission information will be described later.

As illustrated in FIG. 4, the character conversion apparatus 20 according to this embodiment includes a communicator 201 and a character conversion processor 202. Each of these functional units is implemented by the CPU 27 performing processes in accordance with one or more programs installed in the character conversion apparatus 20.

The communicator 201 communicates various kinds of data with another apparatus (e.g., the electronic whiteboard 10 or the decision-making assistance service 40). That is, for example, the communicator 201 transmits text data obtained through conversion performed by the character conversion processor 202 to the decision-making assistance service 40. In addition, the communicator 201 transmits decision-making assistance data received from the decision-making assistance service 40 to the electronic whiteboard 10.

The character conversion processor 202 converts handwritten-character data received via the communicator 201 into text data. Note that the character conversion processor 202 converts handwritten-character data into text data by using, for example, the optical character recognition (OCR) technology or the like.

<Details of Processes>

Next, details of processes performed by the conference assistance system 1 according to this embodiment will be described.

Figure 5:
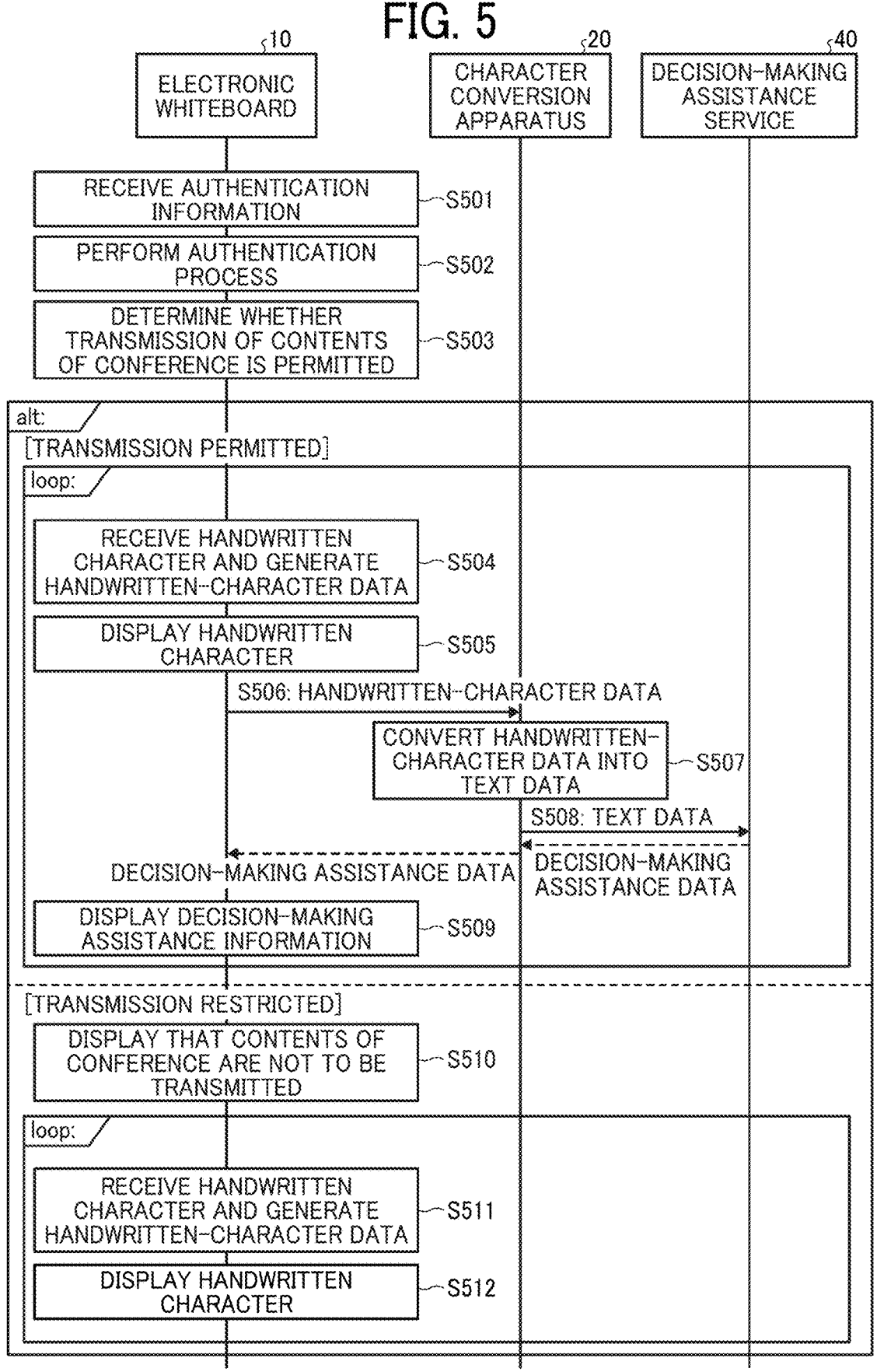
FIG. 5 is a sequence diagram illustrating an exemplary process of inputting a handwritten character according to the first embodiment.

First, a case will be described with reference to FIG. 5 in which, at a conference or the like that uses the electronic whiteboard 10, for example, a participant at the conference inputs contents of the conference by handwriting. In this disclosure, the handwriting corresponds to any writing made by the user using a user's finger, a user's hand, electronic pen, etc. FIG. 5 is a sequence illustrating an exemplary process of inputting a handwritten character according to this embodiment.

First, the input receiver 101 of the electronic whiteboard 10 receives an operation of inputting authentication information for a user, who is a participant at the conference, to start using the electronic whiteboard 10 (step S501). Note that the operation of inputting authentication information may be, for example, performed by a user inputting a combination of a user ID and a password (authentication information) on a screen displayed by the display control 102.

The operation of inputting authentication information may alternatively be performed by a user, who brings an integrated circuit (IC) card close into the electronic whiteboard 10 at a predetermined position such as where a card reader is provided. In this case, the input receiver 101 receives input of the authentication information that is recorded on the IC card.

Subsequently, the authentication processor 103 of the electronic whiteboard 10 performs authentication based on the authentication information whose input has been received by the input receiver 101 (step S502). That is, the authentication processor 103 performs an authentication process by, for example, determining whether a combination of a user ID and a password (authentication information) whose input has been received by the input receiver 101 corresponds to a combination of a user ID and a password that is previously registered in a memory such as the transmission-permission information memory 109. Alternatively, the authentication processor 103 authenticates the user, when the user ID read out from the IC card of the user is found in the transmission-permission information stored in the transmission-permission-information memory 109.

Alternatively, the electronic whiteboard 10 may send authentication information input by the user to an authentication server, which stores authentication information of the registered user, to request for user authentication. In such case, a part of the transmission permission determiner 108 that performs authentication and the transmission-permission-information memory 109 do not have to be provided at the electronic whiteboard 10.

The following description is made on the assumption that the authentication in step S502 above was successful. Note that the authentication process in step S502 above is not necessarily performed. That is, the electronic whiteboard 10 according to this embodiment at least receives input of the user ID in step S501 above.

Subsequently, referring to transmission-permission information stored in the transmission-permission-information memory 109, the transmission permission determiner 108 of the electronic whiteboard 10 determines whether handwritten-character data is to be transmitted (whether transmission is permitted) to the character conversion apparatus 20 (step S503).

Figures 6, 7:
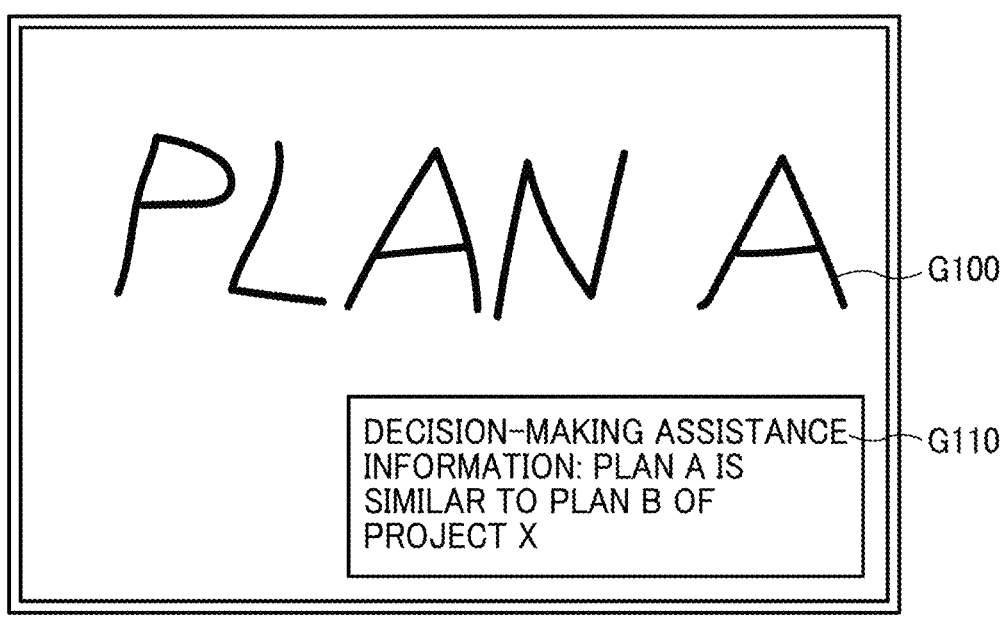
FIG. 6 is an illustration of exemplary transmission-permission information.
FIG. 7 is an illustration of an exemplary screen on which decision-making assistance information is displayed.

The transmission-permission information stored in the transmission-permission-information memory 109 will now be described with reference to FIG. 6. FIG. 6 illustrates exemplary transmission-permission information stored in the transmission-permission-information memory 109.

As illustrated in FIG. 6, the transmission-permission information stored in the transmission-permission-information memory 109 includes "user ID", "name", "appointment", and the like as data items. "User ID" is an identifier for identifying each user who uses the electronic whiteboard 10. "Name" is the name of the user. "Appointment" is the appointment (e.g., department manager or division chief) of the user. In this manner, the user ID and information about the appointment and the like are associated with each other in the transmission-permission information. The transmission-permission information may further include a password of the user in association with the user ID.

The transmission permission determiner 108 determines whether transmission is permitted by determining, for example, whether the appointment associated with the user ID included in the authentication information whose input has been received by the input receiver 101 is a predetermined appointment.

That is, referring to the transmission-permission information stored in the transmission-permission-information memory 109, if the appointment associated with the user ID included in the authentication information is, for example, a department manager or a higher appointment, the transmission permission determiner 108 determines that transmission is restricted. On the other hand, if the appointment associated with the user ID included in the authentication information is, for example, lower than the department manager, the transmission permission determiner 108 determines that transmission is permitted.

Note that if a plurality of pieces of authentication information are input (e.g., if all participants at a conference swipe their IC cards) in step S501 above, the transmission permission determiner 108 may determine whether an appointment associated with at least one of the user IDs included in the plurality of pieces of authentication information is a predetermined appointment.

Alternatively, the transmission permission determiner 108 may determine whether an appointment associated with the user ID having the highest level of appointment, is higher than the predetermined appointment.

In addition to the determination as to whether transmission is permitted in accordance with the appointment of each user, the transmission permission determiner 108 may determine whether transmission is permitted in accordance with, for example, the organization, department, team, division, or the like to which the user belongs. Furthermore, the transmission permission determiner 108 may determine whether transmission is permitted in accordance with, for example, the device ID, installed location, or the like of the electronic whiteboard 10 instead of the user who uses the electronic whiteboard 10. Note that "name", "appointment", "organization", "department", "team", "division", and the like are examples of the attribute information of a user in this example. In addition, "appointment" is an example of the appointment information in this example.

If the transmission permission determiner 108 determines that transmission is permitted in step S503, the conference assistance system 1 according to this embodiment performs step S504 through step S509, which will be described later, every time an operation of inputting a handwritten character is performed in the electronic whiteboard 10.

That is, the input receiver 101 of the electronic whiteboard 10 receives an operation of inputting a handwritten character performed by a user. Subsequently, the handwritten-character-data generation processor 105 of the electronic whiteboard 10 generates data representing the handwritten character (handwritten-character data) received by the input receiver 101 (step S504).

At this time, the handwritten-character-data generation processor 105 may generate image data representing each handwritten character that has been input by a user as the handwritten-character data or may generate stroke data representing each stroke of each handwritten character as the handwritten-character data. Note that the operation of inputting a handwritten character may be performed by a user by, for example, writing the character on the display 12 with an electronic pen or a user's finger.

The display control 102 of the electronic whiteboard 10 displays the handwritten character represented by the handwritten-character data generated by the handwritten-character-data generation processor 105 on the display 12 (step S505). Thus, the handwritten character that has been input by a user is displayed.

Subsequently, the handwritten-character-data generation processor 105 of the electronic whiteboard 10 transmits the handwritten-character data to the character conversion apparatus 20 via the communicator 104 (step S506).

Upon reception of the handwritten-character data via the communicator 201, the character conversion processor 202 of the character conversion apparatus 20 converts the handwritten-character data into text data (step S507).

Subsequently, the character conversion processor 202 of the character conversion apparatus 20 transmits the text data obtained through conversion in step S507 above to the decision-making assistance service 40 via the communicator 201 (step S508). Note that transmission of the text data can be performed through, for example, a web application programming interface (WebAPI) provided by the decision-making assistance service 40.

In response, the decision-making assistance service 40 transmits decision-making assistance data to the electronic whiteboard 10 via the character conversion apparatus 20.

Note that the character conversion apparatus 20 may transmit the text data back to the electronic whiteboard 10 in step S508 above. In this case, the electronic whiteboard 10 transmits the text data transmitted back from the character conversion apparatus 20 to the decision-making assistance service 40.

Upon reception of the decision-making assistance data via the communicator 104, the display control 102 of the electronic whiteboard 10 displays decision-making assistance information (step S509).

That is, as illustrated in FIG. 7, for example, the display control 102 displays decision-making assistance information G110 represented by the decision-making assistance data on a screen G100 displayed on the display 12.

Note that in the example illustrated in FIG. 7, the displayed decision-making assistance information G110 indicates that Plan B, which is similar to handwritten characters "Plan A" that have been input by a user, is being developed by another project (Project X).

In the above manner, with the conference assistance system 1 according to this embodiment, the handwritten character that has been input by a user is converted into a text, and then the text is transmitted to the decision-making assistance service 40, and thereby, for example, information for assisting decision-making of a committee or the like is displayed on the electronic whiteboard 10. Thus, a committee that uses the electronic whiteboard 10 can expect a reduction in fruitless arguments, prompt decision-making, and the like.

On the other hand, if the transmission permission determiner 108 determines that the transmission is restricted in step S503, the conference assistance system 1 according to this embodiment performs step S510, which will be described later. In addition, after step S510, the conference assistance system 1 according to this embodiment performs step S511 and step S512, which will be described later, every time an operation of inputting a handwritten character is performed in the electronic whiteboard 10.

That is, the display control 102 of the electronic whiteboard 10 displays an icon indicating that contents of a conference are not to be transmitted (i.e., indicating that handwritten-character data is not to be transmitted to the character conversion apparatus 20) (step S510).

Figure 8:
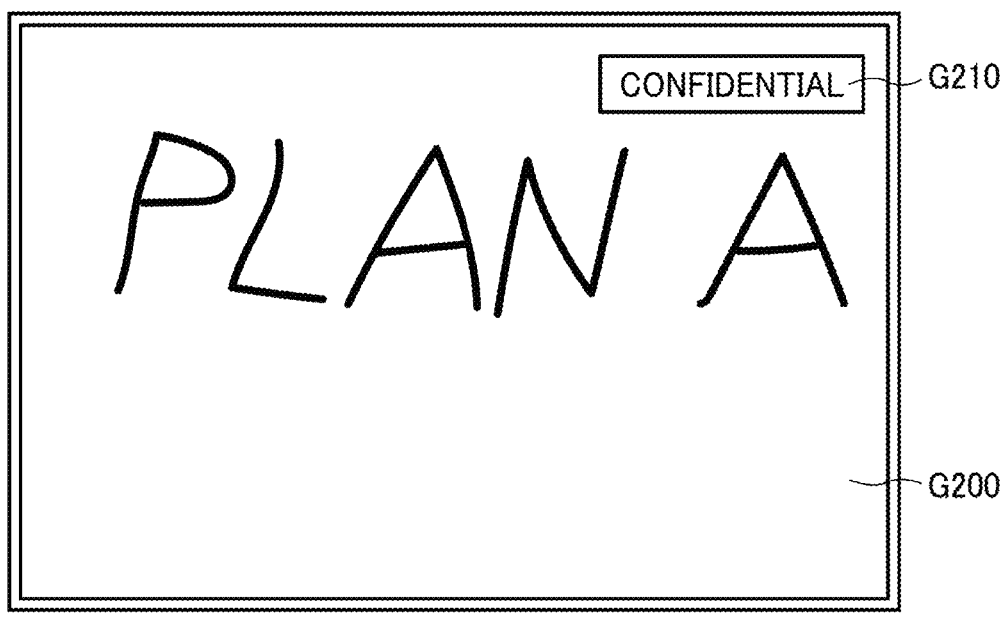
FIG. 8 is an illustration of an exemplary screen on which an icon indicating non-transmission of contents of a conference is displayed.

That is, the display control 102 displays, for example, an icon G210 indicating that contents of a conference are not to be transmitted (e.g., contents of a conference are confidential) on a screen G200 displayed on the display 12, as illustrated in FIG. 8. Thus, for example, participants at the conference can understand that the contents that have been input to the electronic whiteboard 10 by handwriting are not to be transmitted externally (to the decision-making assistance service 40). Accordingly, for example, the participants at the conference can feel free to argue over an agenda or the like including confidential information or the like. Note that the icon G210 is an example of the display component in the scope of claims.

Note that on the screen G200 illustrated in FIG. 8, for example, if a user depresses the icon G210 (unlocks "confidential"), the electronic whiteboard 10 may transmit contents of the conference (i.e., transmit handwritten-character data to the character conversion apparatus 20).

Subsequently, the input receiver 101 of the electronic whiteboard 10 receives an operation of inputting a handwritten character performed by a user. Subsequently, the handwritten-character-data generation processor 105 of the electronic whiteboard 10 generates data representing the handwritten character (handwritten-character data) received by the input receiver 101 (step S511).

Subsequently, the display control 102 of the electronic whiteboard 10 displays the handwritten character represented by the handwritten-character data generated by the handwritten-character-data generation processor 105 on the display 12 (step S512). Thus, the handwritten character that has been input by a user is displayed.

In the above manner, the electronic whiteboard 10 according to this embodiment determines whether contents of the conference, which have been input by handwriting, are to be transmitted externally (to the decision-making assistance service 40 or the like) in accordance with the appointment or the like of a participant (user) who uses the electronic whiteboard 10.

Thus, with the conference assistance system 1 according to this embodiment, for example, at a conference in which a director or the like of a company participates, among contents of the conference that have been input to the electronic whiteboard 10 by handwriting, confidential information can be prevented from being leaked to the decision-making assistance service 40, even when such service 40 is provided on a public network such as the Internet.

There is also a case in which the decision-making assistance service 40 provides optimal decision-making assistance data from accumulated pieces of information of the past. With such a decision-making assistance service 40, confidential information (or information based on the confidential information) transmitted to the decision-making assistance service 40 might possibly be provided to another user of the electronic whiteboard 10 as decision-making assistance information.

Thus, with the conference assistance system 1 according to this embodiment, confidential information or the like can be prevented from being provided to another user of the electronic whiteboard 10 as decision-making assistance information.

Figure 9:
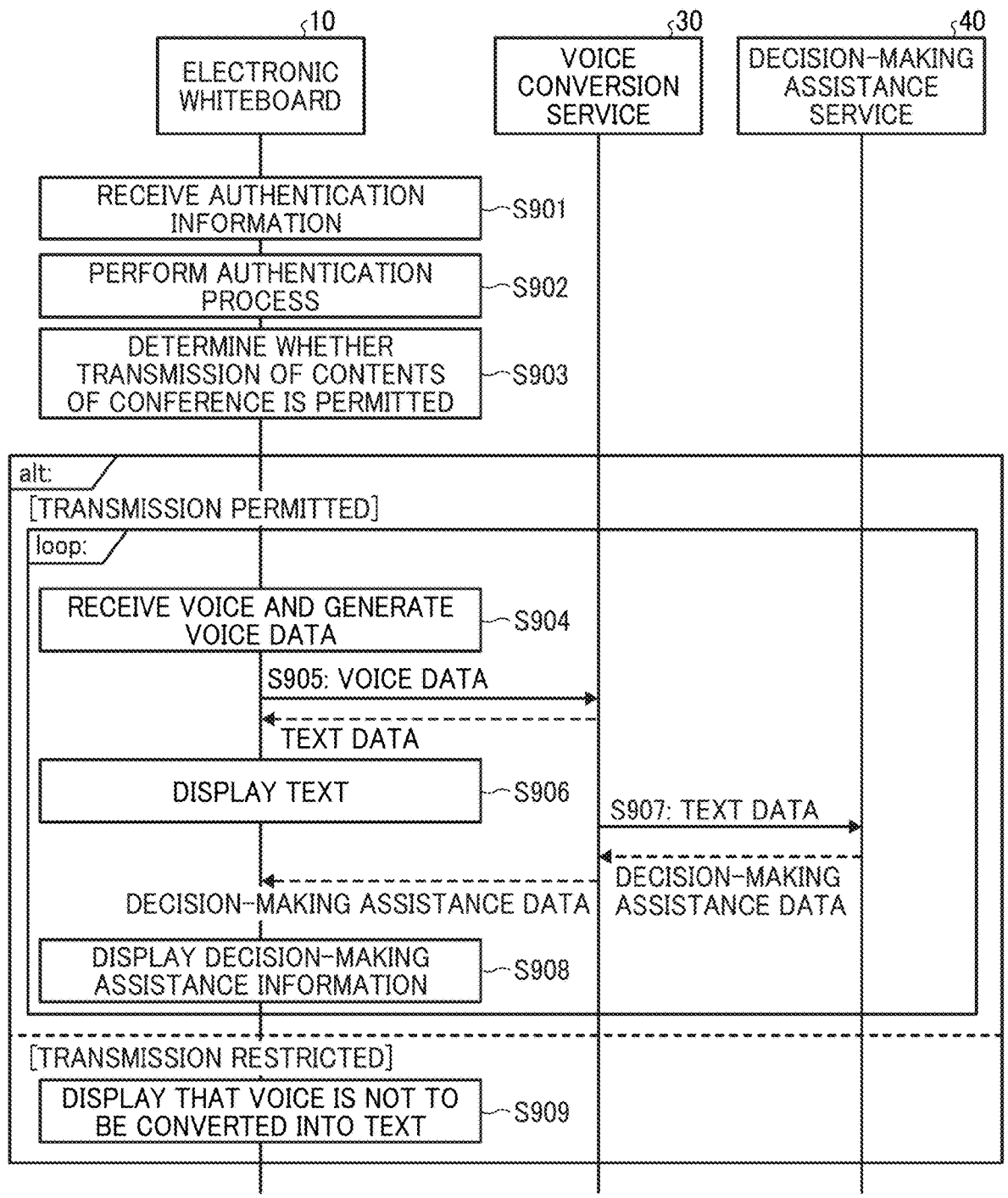
FIG. 9 is a sequence diagram illustrating an exemplary process of inputting voice according to the first embodiment.

Next, a case will be described with reference to FIG. 9 in which, at a conference or the like that uses the electronic whiteboard 10, for example, voice of a speech of a participant or the like at the conference collected as contents of the conference is input. FIG. 9 is a sequence illustrating an exemplary process of inputting voice according to this embodiment. Note that step S901 through step S903 are substantially the same as step S501 through step S503 in FIG. 5, respectively, and therefore description thereof will be omitted.

If the transmission permission determiner 108 determines that transmission is permitted in step S903, the conference assistance system 1 according to this embodiment performs step S904 through step S908 described below every time voice is collected by the sound collecting device 19 of the electronic whiteboard 10.

That is, the voice input 106 of the electronic whiteboard 10 inputs the voice collected by the sound collecting device 19. Subsequently, the voice-data generation processor 107 of the electronic whiteboard 10 generates data representing the voice (voice data) that has been input by the voice input 106 (step S904).

Subsequently, the voice-data generation processor 107 of the electronic whiteboard 10 transmits the voice data to the voice conversion service 30 via the communicator 104 (step S905). In response, the voice conversion service 30 converts the voice data into text data and transmits the text data back to the electronic whiteboard 10.

Subsequently, the display control 102 of the electronic whiteboard 10 displays a text represented by the text data transmitted back from the voice conversion service 30 (step S906). Thus, contents or the like of a speech of a participant at the conference are displayed as a text on the display 12 of the electronic whiteboard 10. Note that if, for example, a plurality of pieces of text data and the reliability of the text data (index representing likeliness of conversion) are transmitted back from the voice conversion service 30, the display control 102 may display a text represented by the most reliable text data.

On the other hand, the voice conversion service 30 transmits the text data to the decision-making assistance service 40 (step S907). In response, the decision-making assistance service 40 transmits decision-making assistance data to the electronic whiteboard 10 via the voice conversion service 30.

Note that if the text data is not transmitted in step S907 above, the electronic whiteboard 10 may transmit the text data to the decision-making assistance service 40.

Upon reception of the decision-making assistance data via the communicator 104, the display control 102 of the electronic whiteboard 10 displays decision-making assistance information (step S908). Thus, as in step S509 in FIG. 5, the decision-making assistance information is displayed on the display 12 of the electronic whiteboard 10.

On the other hand, if the transmission permission determiner 108 determines that transmission is restricted in step S903, the conference assistance system 1 according to this embodiment performs step S909 described below.

Figure 10:
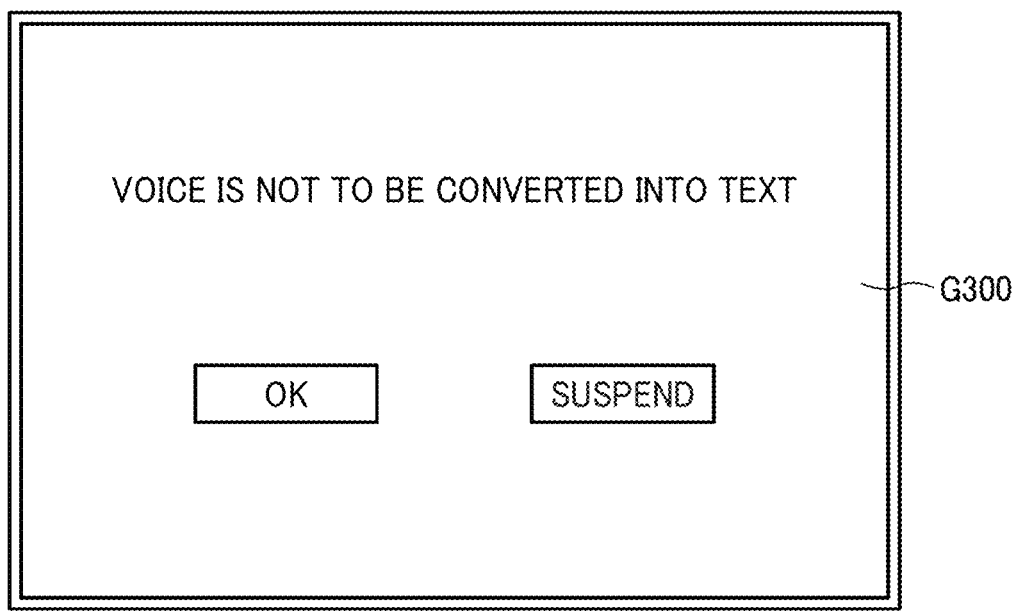
FIG. 10 is an illustration of an exemplary screen on which information indicating incapability of converting voice into a text is displayed.

That is, the display control 102 of the electronic whiteboard 10 displays, for example, a screen G300 illustrated in FIG. 10 (step S909). The screen G300 illustrated in FIG. 10 is a screen that displays information indicating that conversion from voice into a text is not allowed.

In the above manner, if the transmission permission determiner 108 determines that transmission is restricted, the electronic whiteboard 10 according to this embodiment notifies a user that converting voice into a text is not allowed.

As described above, the conference assistance system 1 according to this embodiment determines whether handwritten-character data or voice data is to be transmitted in accordance with a user who uses the electronic whiteboard 10. Thus, the conference assistance system 1 according to this embodiment can prevent, for example, contents of the conference from being transmitted in accordance with the attribute (e.g., appointment or department) of a user who uses the electronic whiteboard 10.

Thus, with the conference assistance system 1 according to this embodiment, for example, it is possible to prevent leakage (to the decision-making assistance service 40 or the like) of contents of speeches, handwritten contents, and the like at a highly confidential conference or the like in which a director or the like of a company participates.

Although the input of a handwritten character and the input of voice have been described above with reference to different sequences, these inputs may be performed at the same time. That is, voice and handwritten character may be input to the electronic whiteboard 10 according to this embodiment at the same time.

Note that permission of transmission to the decision-making assistance service 40 can be controlled in some cases by transmitting, to the voice conversion service 30, a flag (transmission-permission flag) indicating whether transmission of text data to the decision-making assistance service 40 is permitted in addition to voice data.

Figure 11:
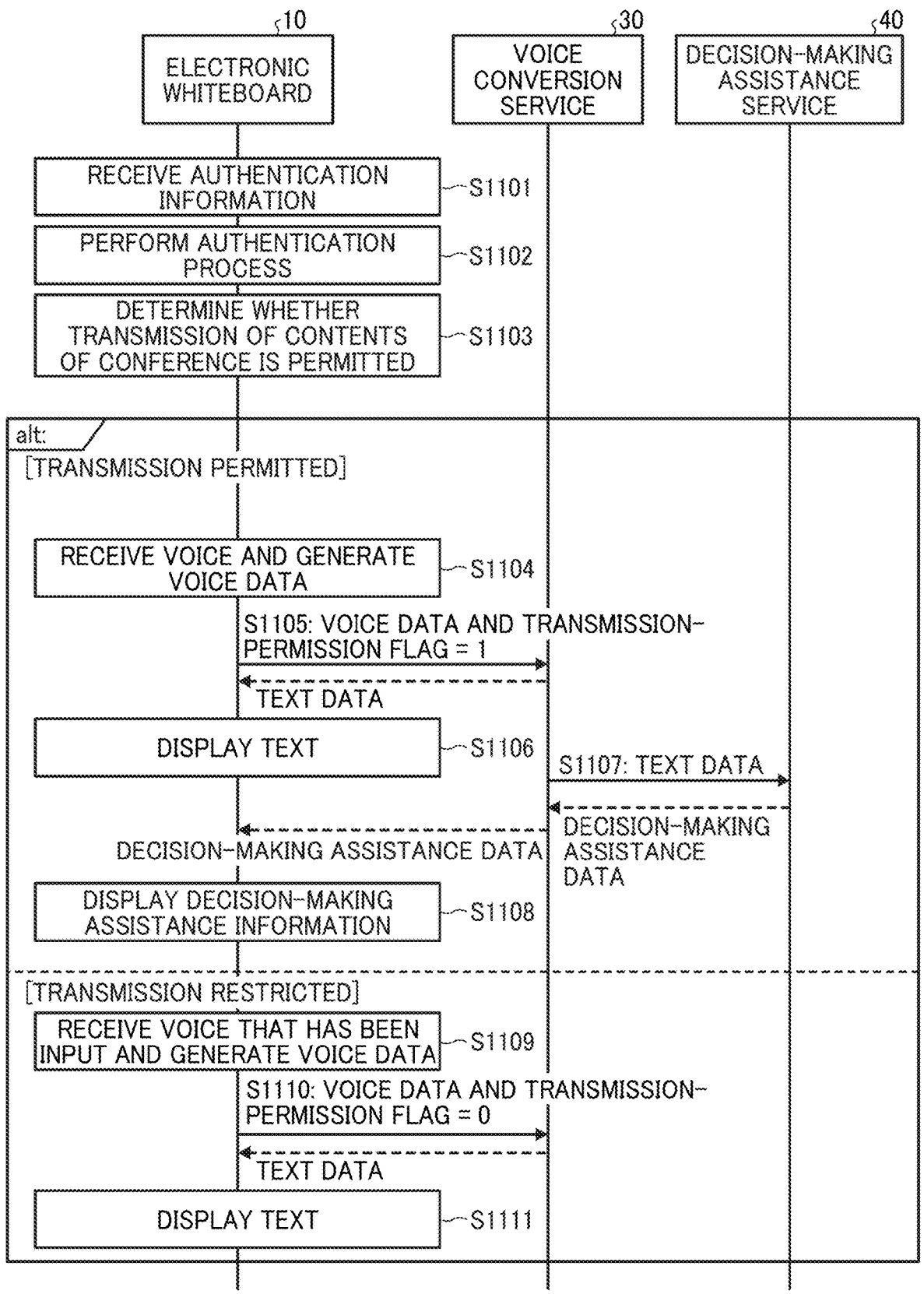
FIG. 11 is a sequence diagram illustrating another exemplary process of inputting voice according to the first embodiment.

Thus, a process of inputting voice in a case in which the electronic whiteboard 10 transmits a transmission-permission flag in addition to voice data will be described below with reference to FIG. 11. FIG. 11 is a sequence illustrating another exemplary process of inputting voice according to this embodiment. Note that step S1101 through step S1103 are substantially the same as step S901 through step S903 in FIG. 9, respectively, and therefore description thereof will be omitted.

If the transmission permission determiner 108 determines that transmission is permitted in step S1103, the conference assistance system 1 according to this embodiment performs step S1104 through S1108 described below every time voice is collected by the sound collecting device 19 of the electronic whiteboard 10.

That is, the voice input 106 of the electronic whiteboard 10 inputs the voice collected by the sound collecting device 19. Subsequently, the voice-data generation processor 107 of the electronic whiteboard 10 generates data representing the voice (voice data) that has been input by the voice input 106 (step S1104).

Subsequently, the voice-data generation processor 107 of the electronic whiteboard 10 transmits the voice data and the transmission-permission flag to the voice conversion service 30 via the communicator 104 (step S1105). At this time, the voice-data generation processor 107 sets the value of the transmission-permission flag to "1" indicating that transmission of text data to the decision-making assistance service 40 is permitted and transmits the transmission-permission flag.

In response, the voice conversion service 30 converts the voice data into text data and transmits the text data back to the electronic whiteboard 10.

Subsequently, the display control 102 of the electronic whiteboard 10 displays a text represented by the text data that has been transmitted back from the voice conversion service 30 (step S1106).

On the other hand, since the value of the transmission-permission flag is "1", the voice conversion service 30 transmits the text data to the decision-making assistance service 40 (step S1107). In response, the decision-making assistance service 40 transmits decision-making assistance data to the electronic whiteboard 10 via the voice conversion service 30.

Upon reception of the decision-making assistance data via the communicator 104, the display control 102 of the electronic whiteboard 10 displays decision-making assistance information (step S1108).

On the other hand, if the transmission permission determiner 108 determines that transmission is restricted in step S1103, the conference assistance system 1 according to this embodiment performs step S1109 through step S1111 described below.

That is, as in step S1104 above, the voice input 106 of the electronic whiteboard 10 inputs the voice that has been collected by the sound collecting device 19. Subsequently, the voice-data generation processor 107 of the electronic whiteboard 10 generates data representing the voice (voice data) that has been input by the voice input 106 (step S1109).

Subsequently, the voice-data generation processor 107 of the electronic whiteboard 10 transmits the voice data and the transmission-permission flag to the voice conversion service 30 via the communicator 104 (step S1110). At this time, the voice-data generation processor 107 sets the value of the transmission-permission flag to "0" indicating that transmission of text data to the decision-making assistance service 40 is restricted and transmits the transmission-permission flag.

In response, the voice conversion service 30 converts the voice data into text data and transmits the text data back to the electronic whiteboard 10. Note that since the value of the transmission-permission flag is "0", the voice conversion service 30 does not transmit the text data to the decision-making assistance service 40.

Subsequently, as in step S1106 above, the display control 102 of the electronic whiteboard 10 displays a text represented by the text data that has been transmitted back from the voice conversion service 30 (step S1111).

In the above manner, if transmission of text data to the decision-making assistance service 40 can be controlled by transmitting a transmission-permission flag to the voice conversion service 30, the electronic whiteboard 10 according to this embodiment transmits the transmission-permission flag in addition to voice data to the voice conversion service 30. Thus, the electronic whiteboard 10 according to this embodiment can display text data obtained through conversion of the voice data even if the transmission permission determiner 108 determines that transmission is restricted, as described in step S1109 through step S1111 above.

Next, a second embodiment will be described. The second embodiment will describe a case in which, for example, before starting a conference, a user can select in the electronic whiteboard 10 whether contents of the conference are to be transmitted.

<Functional Configuration>

Figure 12:
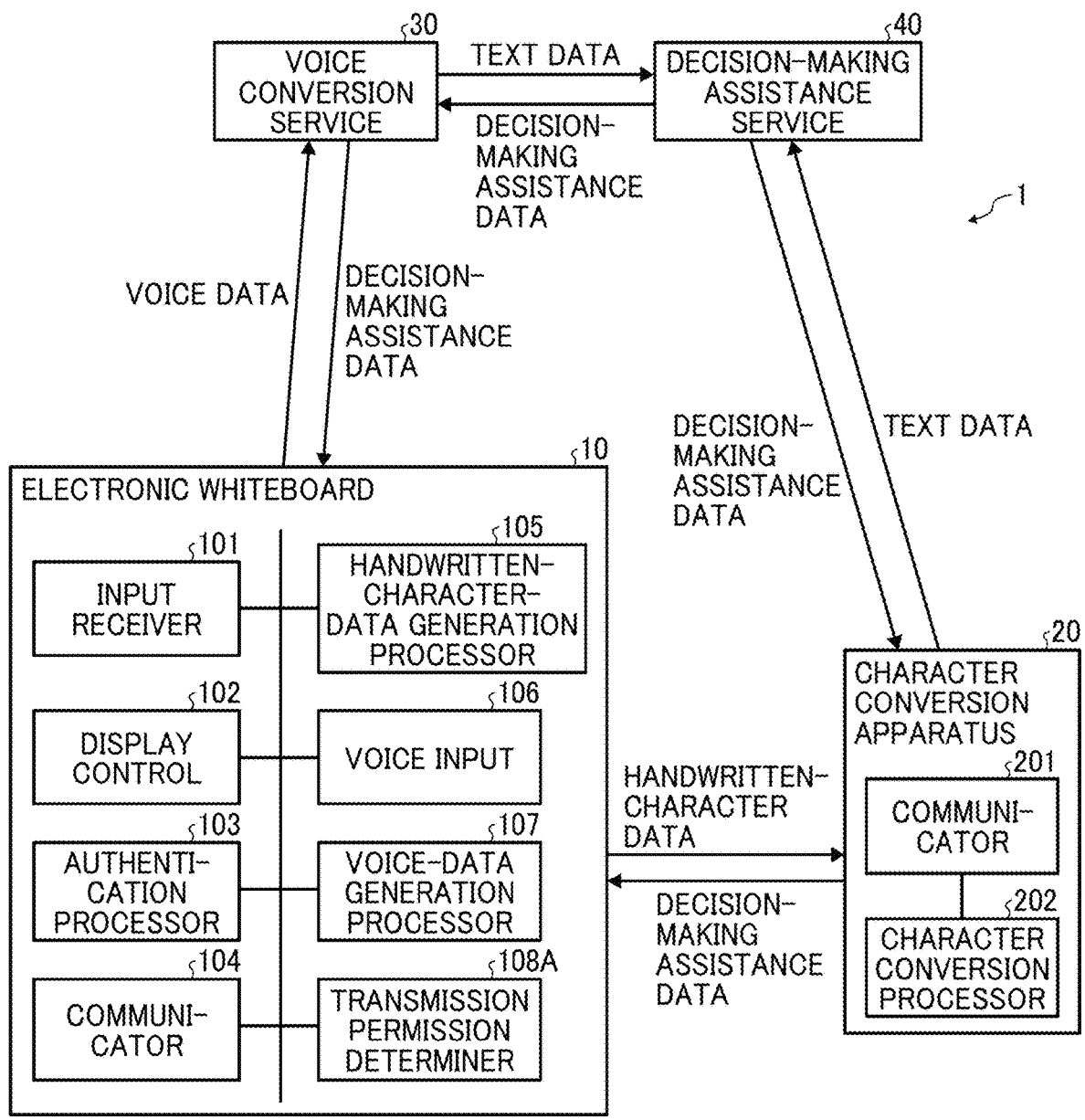
FIG. 12 is a diagram illustrating an exemplary functional configuration of a conference assistance system according to a second embodiment.

First, a functional configuration of the conference assistance system 1 according to this embodiment will be described with reference to FIG. 12. FIG. 12 illustrates an exemplary functional configuration of the conference assistance system 1 according to this embodiment. Note that functional components that are substantially the same as those in the first embodiment will not be repeatedly described.

As illustrated in FIG. 12, the electronic whiteboard 10 of the conference assistance system 1 according to this embodiment includes a transmission permission determiner 108A. In accordance with selection on a predetermined screen (screen for a user to select whether transmission of contents of a conference is permitted) displayed by the display control 102, the transmission permission determiner 108A determines whether handwritten-character data and voice data are to be transmitted to the character conversion apparatus 20 and the voice conversion service 30.

<Details of Processes>

Next, details of processes performed by the conference assistance system 1 according to this embodiment will be described.

Figure 13:
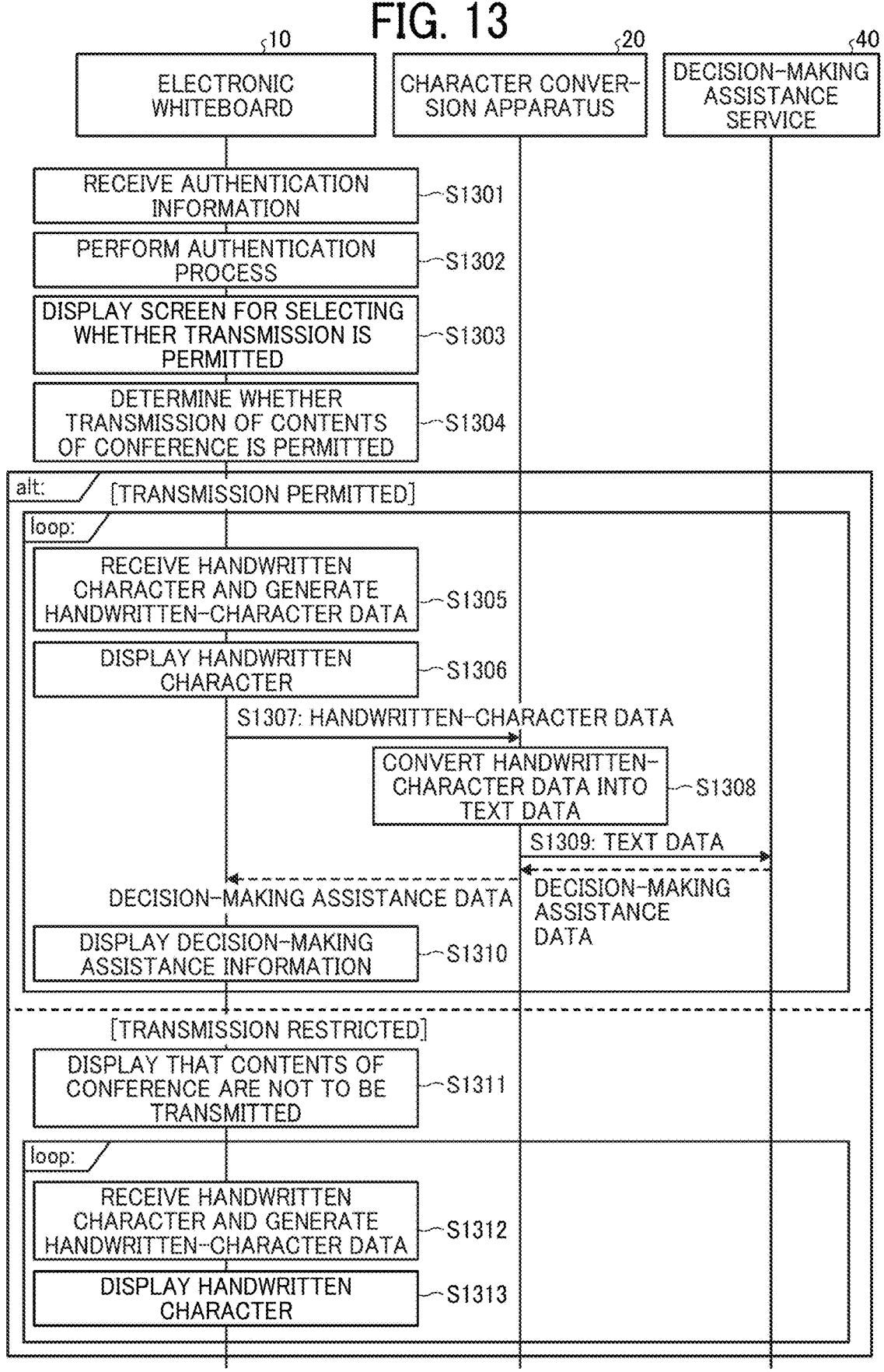
FIG. 13 is a sequence diagram illustrating an exemplary process of inputting a handwritten character according to the second embodiment.

First, a case will be described with reference to FIG. 13 in which, at a conference or the like that uses the electronic whiteboard 10, for example, a participant or the like at the conference inputs contents of the conference by handwriting. FIG. 13 is a sequence illustrating an exemplary process of inputting a handwritten character according to this embodiment. Note that step S1301 and step S1302 are substantially the same as step S501 and step S502 in FIG. 5, respectively, and therefore description thereof will be omitted.

Figure 14:
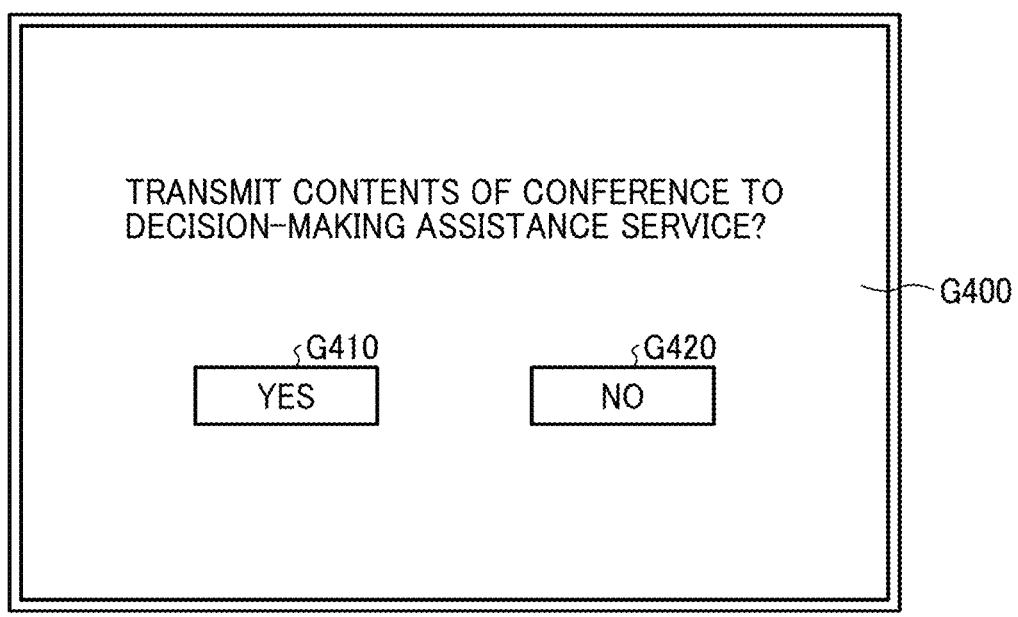
FIG. 14 is an illustration of an exemplary screen for selecting whether contents of a conference are to be transmitted.

Following step S1302, the display control 102 of the electronic whiteboard 10 displays a screen G400 for a user to select whether contents of the conference are to be transmitted, such as the screen illustrated in FIG. 14 (step S1303).

Note that the screen G400 illustrated in FIG. 14 includes an "YES" button G410 for selecting transmission of contents of the conference (transmission permission) and a "NO" button G420 for selecting non-transmission of contents of the conference (transmission restriction).

Subsequently, the transmission permission determiner 108A of the electronic whiteboard 10 determines whether handwritten-character data is to be transmitted (transmission permission/restriction) to the character conversion apparatus 20 (step S1304). That is, the transmission permission determiner 108A determines, for example, which of the "YES" button G410 and the "NO" button G420 has been selected on the screen G400 illustrated in FIG. 14 to determine transmission permission/restriction.

If the transmission permission determiner 108A determines that the transmission is permitted in step S1304, the conference assistance system 1 according to this embodiment performs step S1305 through step S1310 every time an operation of inputting a handwritten character is performed in the electronic whiteboard 10. Note that step S1305 through step S1310 are substantially the same as step S504 through step S509 in FIG. 5, respectively, and therefore description thereof will be omitted.

On the other hand, if the transmission permission determiner 108A determines that the transmission is restricted in step S1304, the conference assistance system 1 according to this embodiment performs step S1311. Subsequently, the conference assistance system 1 according to this embodiment performs step S1312 and step S1313 every time an operation of inputting a handwritten character is performed in the electronic whiteboard 10. Note that step S1311 through step S1313 are substantially the same as step S510 through S512 in FIG. 5, respectively, and therefore description thereof will be omitted.

In the above manner, with the conference assistance system 1 according to this embodiment, a user selects whether the transmission is permitted in the electronic whiteboard 10 so as to control whether transmission of the handwritten-character data is permitted. Thus, before starting a conference that uses the electronic whiteboard 10 according to this embodiment, for example, a participant or the like at the conference can select whether transmission of the handwritten-character data is permitted in accordance with the agenda to be argued about.

Figure 15:
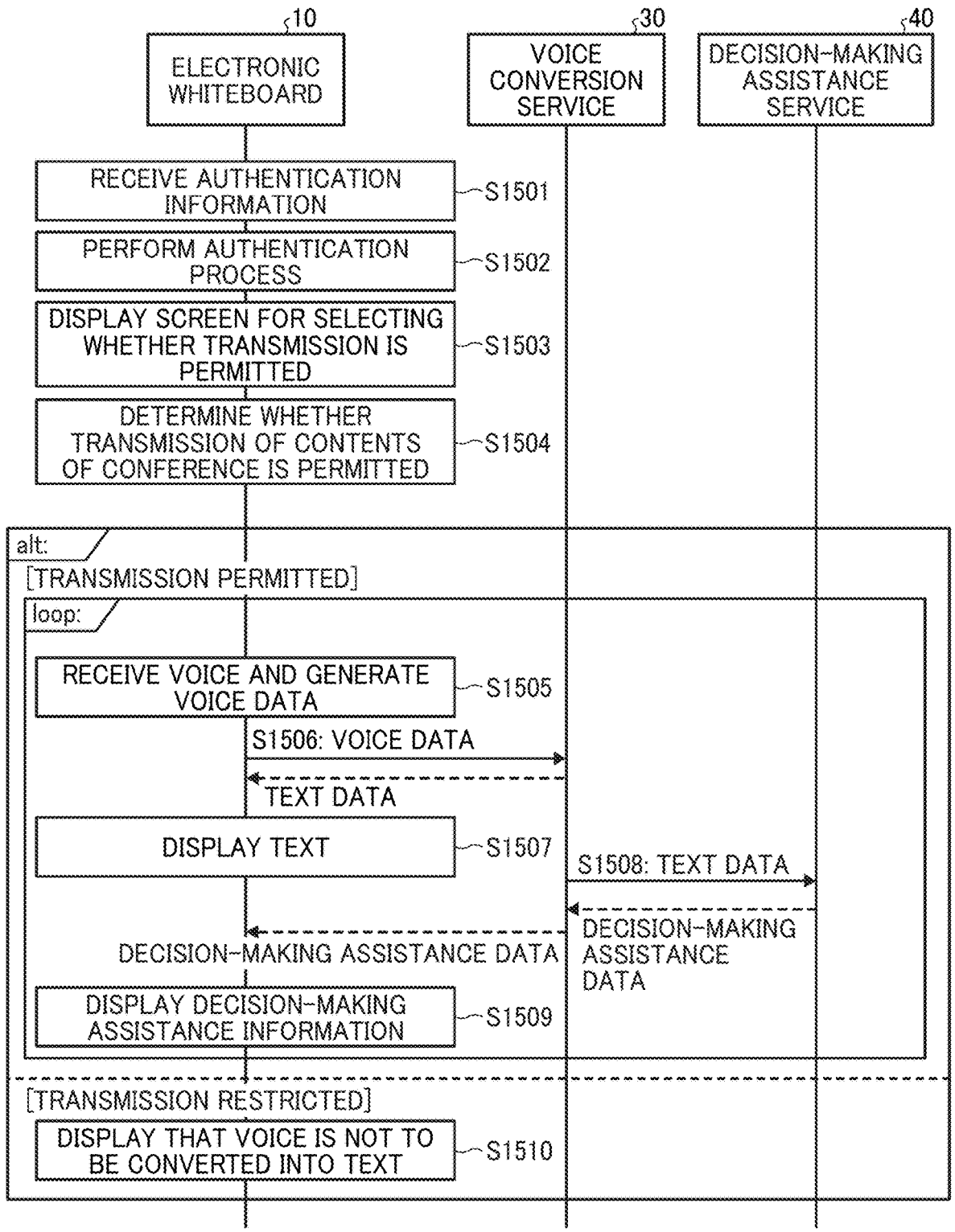
FIG. 15 is a sequence diagram illustrating an exemplary process of inputting voice according to the second embodiment.

Next, a case will be described with reference to FIG. 15 in which, at a conference or the like that uses the electronic whiteboard 10, for example, voice of a speech of a participant or the like at the conference collected as contents of the conference is input. FIG. 15 is a sequence illustrating an exemplary process of inputting voice according to this embodiment.

Note that step S1501 and step S1502 are substantially the same as step S901 and step S902 in FIG. 9, respectively, and therefore description thereof will be omitted.

Following step S1502, as in step S1303 above, the display control 102 of the electronic whiteboard 10 displays the screen G400 for a user to select whether contents of the conference are to be transmitted, such as the screen illustrated in FIG. 14 (step S1503).

Subsequently, the transmission permission determiner 108A of the electronic whiteboard 10 determines whether voice data is to be transmitted (transmission permission/restriction) to the voice conversion service 30 (step S1504). That is, the transmission permission determiner 108A determines, for example, which of the "YES" button G410 and the "NO" button G420 has been selected on the screen G400 illustrated in FIG. 14 to determine transmission permission/restriction.

If the transmission permission determiner 108A determines that the transmission is permitted in step S1504, the conference assistance system 1 according to this embodiment performs step S1505 through step S1509 every time voice is collected by the sound collecting device 19 of the electronic whiteboard 10. Note that step S1505 through step S1509 are substantially the same as step S904 through step S908 in FIG. 9, respectively, and therefore description thereof will be omitted.

On the other hand, if the transmission permission determiner 108A determines that the transmission is restricted in step S1504, the conference assistance system 1 according to this embodiment performs step S1510. Note that step S1510 is substantially the same as step S909 in FIG. 9, and therefore description thereof will be omitted.

In the above manner, with the conference assistance system 1 according to this embodiment, a user selects whether the transmission is permitted in the electronic whiteboard 10 so as to control transmission of the voice data is permitted. Thus, before starting a conference that uses the electronic whiteboard 10 according to this embodiment, for example, a participant or the like at the conference can select whether the transmission of the voice data is permitted in accordance with the agenda to be argued about.

As described above, with the conference assistance system 1 according to this embodiment, for example, before starting a conference, a user of the electronic whiteboard 10 can select whether contents of the conference are to be transmitted to the decision-making assistance service 40. Thus, with the conference assistance system 1 according to this embodiment, for example, it is possible to select whether contents of the conference are to be transmitted to the decision-making assistance service 40 in accordance with the agenda or the like of the conference to be held.

Next, a third embodiment will be described. In the third embodiment, if text data includes a term (confidential word) that has been registered in advance, for example, or a term (similar word) that is similar to the term, the decision-making assistance service 40 transmits back decision-making assistance data indicating that contents of a conference include confidential information.

Thus, for example, upon reception of the decision-making assistance data indicating that contents of the conference include confidential information during the conference, the electronic whiteboard 10 according to this embodiment displays a predetermined screen so as to enable a user to select whether future transmission of contents of the conference is to be suspended.

<Functional Configuration>

Figure 16:
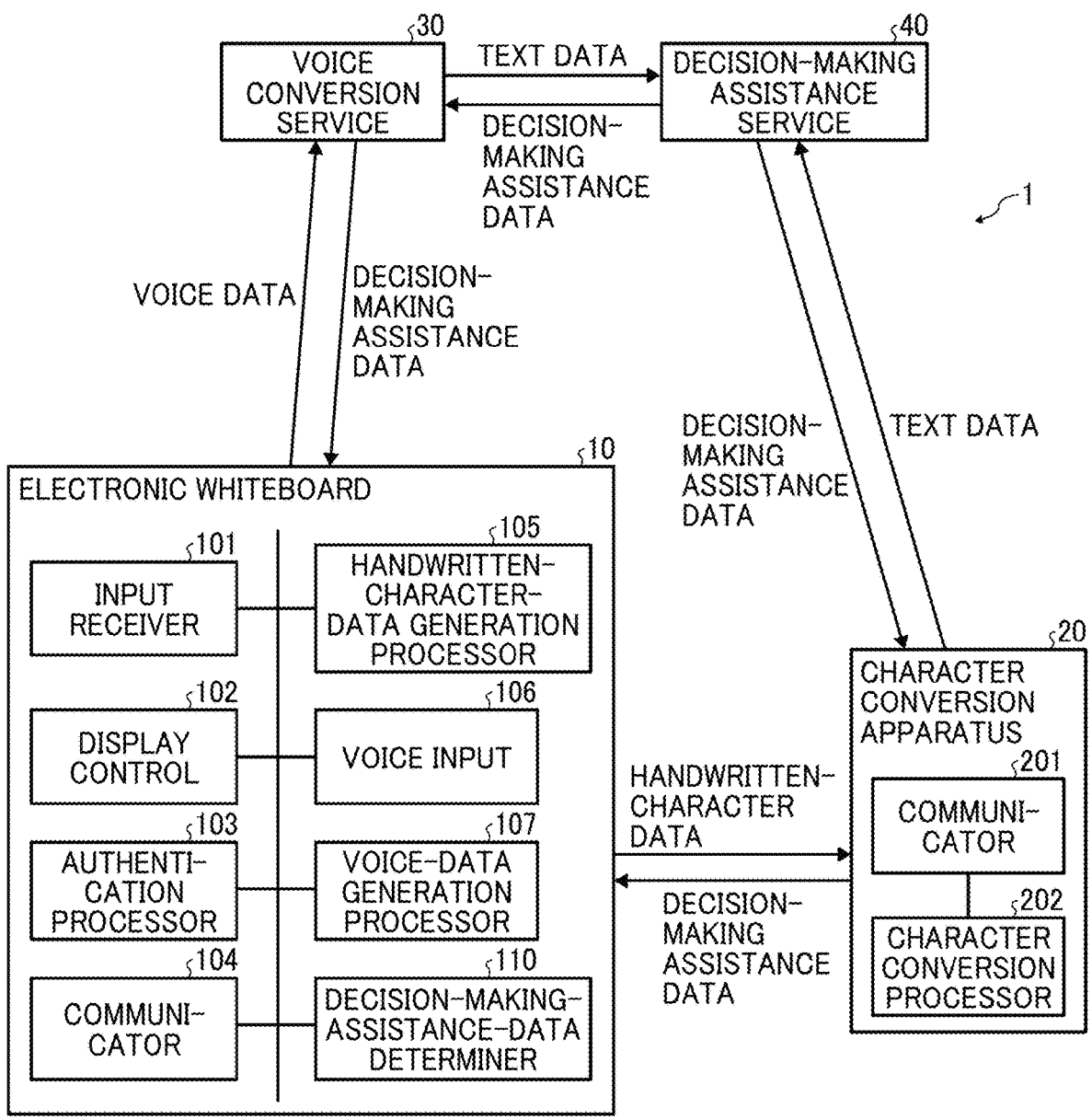
FIG. 16 is a diagram illustrating an exemplary functional configuration of a conference assistance system according to a third embodiment.

First, a functional configuration of the conference assistance system 1 according to this embodiment will be described with reference to FIG. 16. FIG. 16 illustrates an exemplary functional configuration of the conference assistance system 1 according to this embodiment. Note that functional components that are substantially the same as those in the first embodiment will not be repeatedly described.

As illustrated in FIG. 16, the electronic whiteboard 10 of the conference assistance system 1 according to this embodiment includes a decision-making-assistance-data determiner 110. In addition, the electronic whiteboard 10 of the conference assistance system 1 according to this embodiment does not include the transmission permission determiner 108. The decision-making-assistance-data determiner 110 determines whether decision-making assistance data that has been received via the communicator 104 indicates that contents of a conference include confidential information.

<Details of Processes>

Next, details of processes performed by the conference assistance system 1 according to this embodiment will be described.

Figure 17:
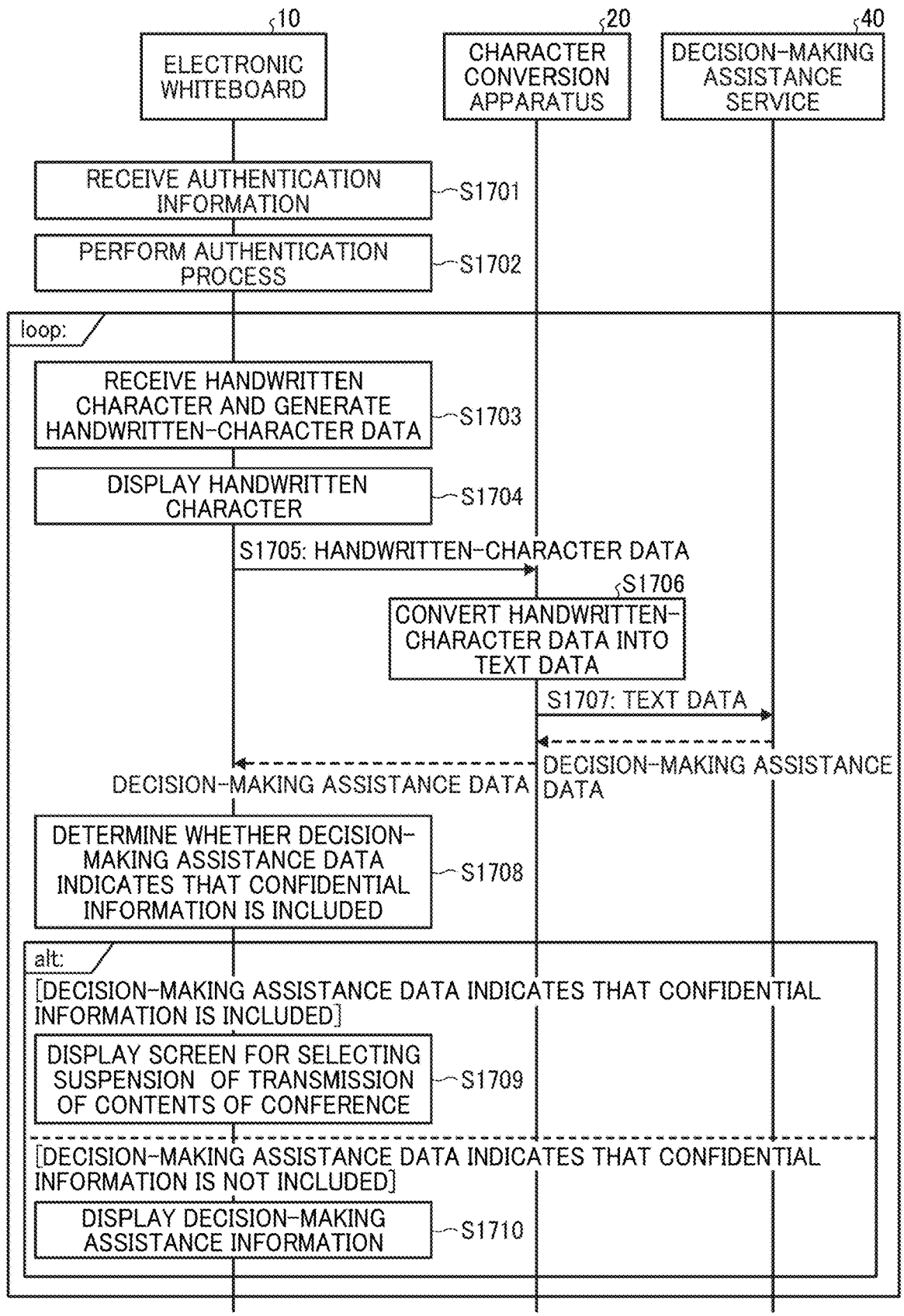
FIG. 17 is a sequence diagram illustrating an exemplary process of inputting a handwritten character according to the third embodiment.

First, a case will be described with reference to FIG. 17 in which, at a conference or the like that uses the electronic whiteboard 10, for example, a participant or the like at the conference inputs contents of the conference by handwriting. FIG. 17 is a sequence illustrating an exemplary process of inputting a handwritten character according to this embodiment. Note that step S1701 and step S1702 are substantially the same as step S1301 and step S1302 in FIG. 13, respectively, and therefore description thereof will be omitted.

The conference assistance system 1 according to this embodiment performs step S1703 through step S1710 every time an operation of inputting a handwritten character is performed in the electronic whiteboard 10. Note that step S1703 through step S1706 are substantially the same as step S1305 through S1308 in FIG. 13, respectively, and therefore description thereof will be omitted.

Following step S1706, text data obtained through conversion in step S1706 is transmitted to the decision-making assistance service 40 via the communicator 201 of the character conversion apparatus 20 (step S1707).

In response, the decision-making assistance service 40 transmits decision-making assistance data to the electronic whiteboard 10 via the character conversion apparatus 20. At this time, the decision-making assistance service 40 determines, for example, a text represented by the text data received from the character conversion apparatus 20 includes a confidential word or a similar word. If the decision-making assistance service 40 determines that the text represented by the text data includes a confidential word or a similar word, the decision-making assistance service 40 transmits decision-making assistance data indicating that confidential information is included to the electronic whiteboard 10 via the character conversion apparatus 20.

Note that the confidential word herein is a term that has been registered in the decision-making assistance service 40 in advance by a user or the like of the electronic whiteboard 10 and is a term related to confidential matter such as "lawsuit", "management planning", or "patent". In addition, the similar word is a term that has a meaning similar to or related to the meaning of the confidential word and is a term similar to a confidential word "lawsuit", such as "trial", "sentence", or "suit". The similar word is, for example, determined by the decision-making assistance service 40 by using the AI technology or an IA based on the confidential word registered by a user or the like, using such as a dictionary.

The decision-making-assistance-data determiner 110 of the electronic whiteboard 10 determines whether the decision-making assistance data received via the communicator 104 indicates that confidential information is included (step S1708).

Figure 18:
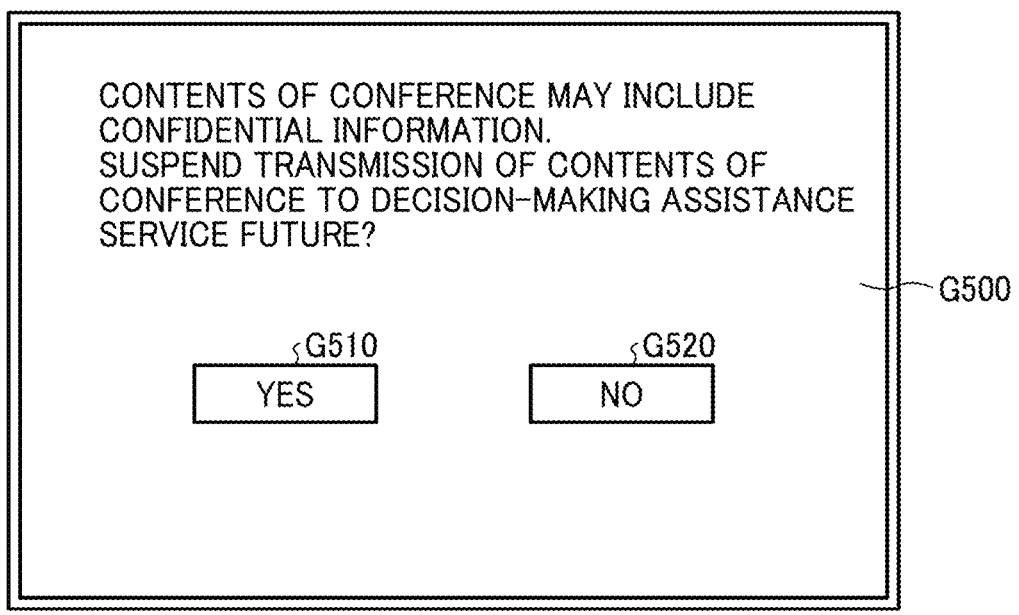
FIG. 18 is an illustration of an exemplary screen for selecting whether transmission of contents of a conference is to be suspended.

If it is determined in step S1708 that the decision-making assistance data indicates that confidential information is included, the display control 102 displays a screen G500 for selecting suspension of transmission of contents of the conference, such as the screen illustrated in FIG. 18 (step S1709). Note that the screen G500 illustrated in FIG. 18 is an example of the selection screen in the scope of claims.

Note that the screen G500 illustrated in FIG. 18 includes an "YES" button G510 for selecting suspension of transmission of contents of the conference and a "NO" button G520 for selecting non-suspension of transmission of contents of the conference.

On the other hand, if it is determined in step S1708 that the decision-making assistance data indicates that confidential information is not included, the display control 102 displays decision-making assistance information (step S1710).

In the above manner, with the conference assistance system 1 according to this embodiment, for example, a user of the electronic whiteboard 10 depresses the "YES" button G510 on the screen G500 illustrated in FIG. 18 to refrain from future transmission of contents of the conference (handwritten-character data). On the other hand, with the conference assistance system 1 according to this embodiment, for example, a user of the electronic whiteboard 10 depresses the "NO" button G520 on the screen G500 illustrated in FIG. 18 to continue transmission of contents of the conference (handwritten-character data).

Figure 19:
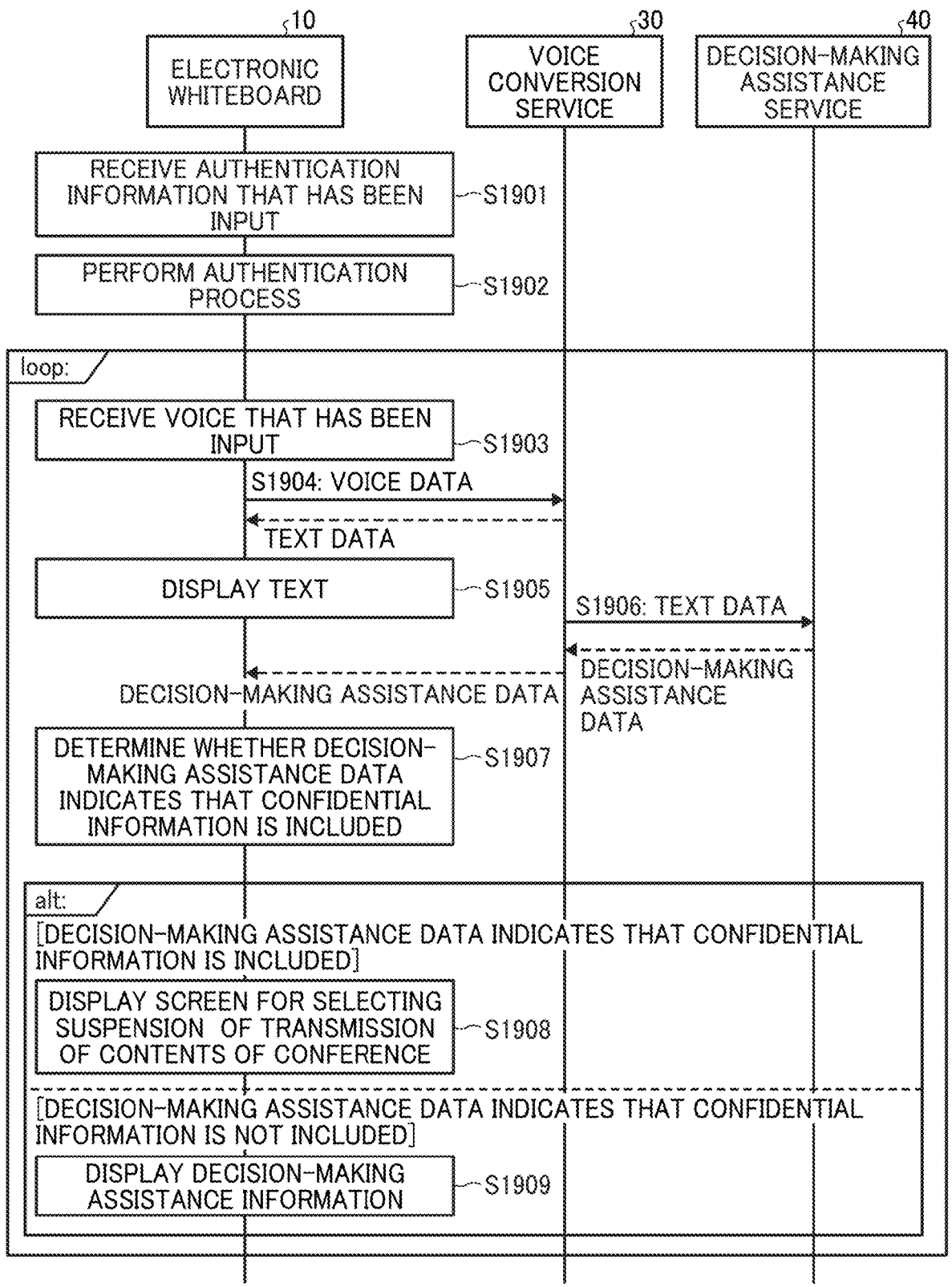
FIG. 19 is a sequence diagram illustrating an exemplary process of inputting voice according to the third embodiment.

Next, a case will be described with reference to FIG. 19 in which, at a conference or the like that uses the electronic whiteboard 10, for example, voice of a speech of a participant or the like at the conference collected as contents of the conference is input. FIG. 19 is a sequence illustrating an exemplary process of inputting voice according to this embodiment. Note that step S1901 and step S1902 are substantially the same as step S1501 and step S1502 in FIG. 15, respectively, and therefore description thereof will be omitted.

The conference assistance system 1 according to this embodiment performs step S1903 through step S1909 every time voice is collected by the sound collecting device 19 of the electronic whiteboard 10. Note that step S1903 through step S1905 are substantially the same as step S1505 through step S1507 in FIG. 15, respectively, and therefore description thereof will be omitted.

The voice conversion service 30 transmits, to the decision-making assistance service 40, text data obtained through conversion of voice data received from the electronic whiteboard 10 (step S1906). In response, the decision-making assistance service 40 transmits decision-making assistance data to the electronic whiteboard 10 via the voice conversion service 30.

At this time, the decision-making assistance service 40 determines, for example, a text represented by the text data received from the voice conversion service 30 includes a confidential word or a similar word. If the decision-making assistance service 40 determines that the text represented by the text data includes a confidential word or a similar word, the decision-making assistance service 40 transmits decision-making assistance data indicating that confidential information is included to the electronic whiteboard 10 via the voice conversion service 30.

The decision-making-assistance-data determiner 110 of the electronic whiteboard 10 determines whether the decision-making assistance data received via the communicator 104 indicates that confidential information is included (step S1907).

If it is determined in step S1907 that the decision-making assistance data indicates that confidential information is included, as in step S1709 above, the display control 102 displays the screen G500 illustrated in FIG. 18 (step S1908).

On the other hand, if it is determined in step S1907 that the decision-making assistance data indicates that confidential information is not included, the display control 102 displays decision-making assistance information (step S1909).

In the above manner, with the conference assistance system 1 according to this embodiment, for example, a user of the electronic whiteboard 10 depresses the "YES" button G510 on the screen G500 illustrated in FIG. 18 to refrain from future transmission of contents of the conference (voice data). On the other hand, with the conference assistance system 1 according to this embodiment, for example, a user of the electronic whiteboard 10 depresses the "NO" button G520 on the screen G500 illustrated in FIG. 18 to continue transmission of contents of the conference (voice data).

As described above, with the conference assistance system 1 according to this embodiment, based on the decision-making assistance data received from the decision-making assistance service 40, a screen for selecting whether transmission of contents of the conference is to be suspended is displayed on the electronic whiteboard 10. Thus, with the conference assistance system 1 according to this embodiment, for example, if the agenda of the conference is changed to confidential matter during the conference, transmission of contents of the conference can be changed to be suspended during the conference.

Next, a fourth embodiment will be described. In the fourth embodiment, in the electronic whiteboard 10, handwritten-character data and voice data are converted into text data, and it is determined whether a text represented by the text data includes confidential information.

<Functional Configuration>

Figure 20:
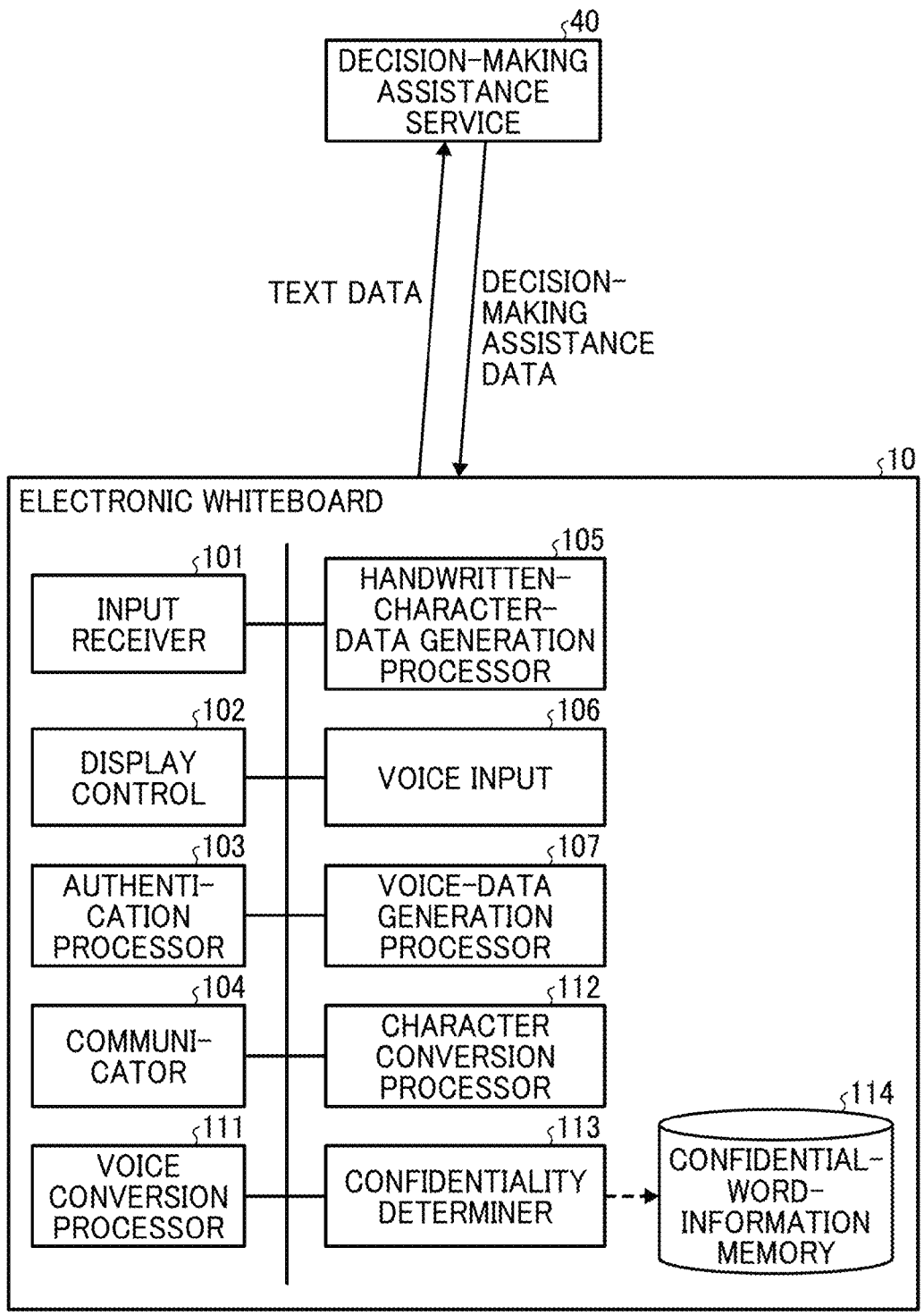
FIG. 20 is a diagram illustrating an exemplary functional configuration of a conference assistance system according to a fourth embodiment.

First, a functional configuration of the conference assistance system 1 according to this embodiment will be described with reference to FIG. 20. FIG. 20 illustrates an exemplary functional configuration of the electronic whiteboard 10 according to this embodiment. Note that functional components that are substantially the same as those in the first embodiment will not be repeatedly described.

As illustrated in FIG. 20, the electronic whiteboard 10 according to this embodiment includes a voice conversion processor 111, a character conversion processor 112, and a confidentiality determiner 113. Each of these functional units is implemented by the CPU 17 performing processes in accordance with one or more programs installed in the electronic whiteboard 10.

In addition, the electronic whiteboard 10 according to this embodiment does not include the transmission permission determiner 108. The electronic whiteboard 10 according to this embodiment further includes a confidential-word-information memory 114. This memory can be implemented by using, for example, the HDD 18. Note that the memory may be implemented by using a memory device or the like connected to the electronic whiteboard 10 via a network.

The voice conversion processor 111 converts voice data generated by the voice-data generation processor 107 into text data by using, for example, the voice recognition technology or the like.

The character conversion processor 112 converts handwritten-character data generated by the handwritten-character-data generation processor 105 into text data by using, for example, the OCR technology or the like.

Referring to confidential-word information stored in the confidential-word-information memory 114, the confidentiality determiner 113 determines whether text data obtained through conversion performed by the voice conversion processor 111 and the character conversion processor 112 includes a confidential word or a similar word.

The confidential-word-information memory 114 stores confidential-word information. Here, the confidential-word information stored in the confidential-word-information memory 114 will be described with reference to FIG. 21. FIG. 21 illustrates exemplary confidential-word information stored in the confidential-word-information memory 114.

As illustrated in FIG. 21, in the confidential-word information stored in the confidential-word-information memory 114, each confidential word is associated with similar words that are similar to or related to the confidential word.

Note that the confidential words are registered, for example, by a user of the electronic whiteboard 10. In addition, for example, on the basis of the confidential words registered by a user or the like, the similar words are determined by the electronic whiteboard 10 or a system that is connected to the electronic whiteboard 10 via a network or the like by using the of AI technology or an IA.

<Details of Processes>

Next, details of processes performed by the conference assistance system 1 according to this embodiment will be described.

Figure 22:
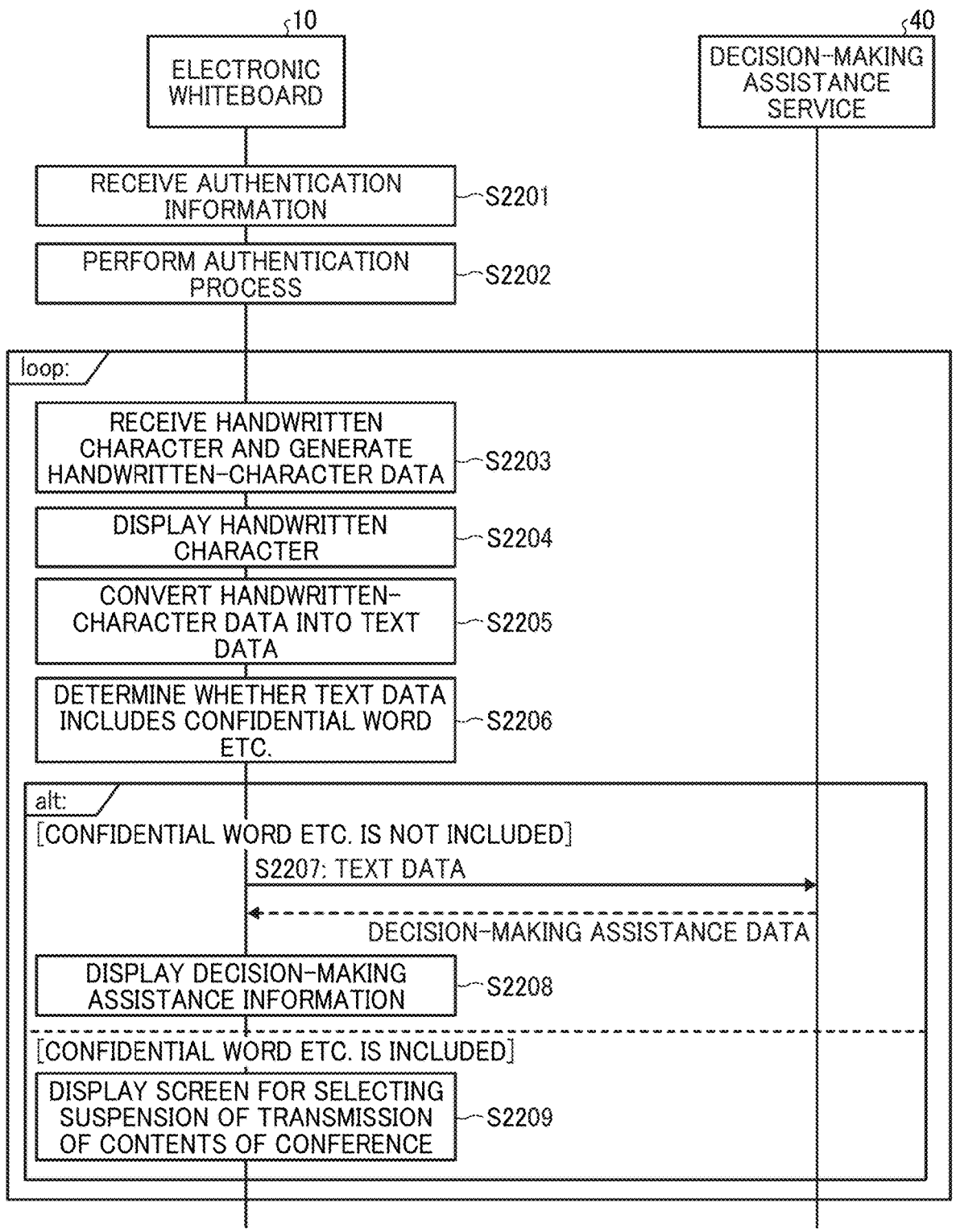
FIG. 22 is a sequence diagram illustrating an exemplary process of inputting a handwritten character according to the fourth embodiment.

First, a case will be described with reference to FIG. 22 in which, at a conference or the like that uses the electronic whiteboard 10, for example, a participant or the like at the conference inputs contents of the conference by handwriting. FIG. 22 is a sequence illustrating an exemplary process of inputting a handwritten character according to this embodiment. Note that step S2201 and step S2202 are substantially the same as step S1701 and step S1702 in FIG. 17, respectively, and therefore description thereof will be omitted.

The electronic whiteboard 10 according to this embodiment performs step S2203 through step S2209 every time an operation of inputting a handwritten character is performed. Note that step S2203 and step S2204 are substantially the same as step S1703 and S1704 in FIG. 17, respectively, and therefore description thereof will be omitted.

Following step S2204, the character conversion processor 112 of the electronic whiteboard 10 converts the handwritten-character data generated in step S2203 into text data (step S2205).

Subsequently, referring to confidential-word information stored in the confidential-word-information memory 114, the confidentiality determiner 113 of the electronic whiteboard 10 determines whether at least one of a confidential word and a similar word is included in a text represented by the text data (step S2206).

If it is determined in step S2206 that none of the confidential word and the similar word is included, the communicator 104 of the electronic whiteboard 10 transmits the text data to the decision-making assistance service 40 (step S2207). In response, the decision-making assistance service 40 transmits decision-making assistance data to the electronic whiteboard 10.

Upon reception of the decision-making assistance data via the communicator 104, the display control 102 of the electronic whiteboard 10 displays decision-making assistance information (step S2208).

On the other hand, if it is determined in step S2206 that at least one of the confidential word and the similar word is included, the display control 102 of the electronic whiteboard 10 displays the screen G500 for selecting suspension of transmission of contents of the conference, such as the screen illustrated in FIG. 18 (step S2209).

In the above manner, the electronic whiteboard 10 according to this embodiment converts handwritten-character data into text data and determines whether a text represented by the text data includes a confidential word or the like. Thus, the electronic whiteboard 10 according to this embodiment can transmit only text data including the confidential word or the like to the decision-making assistance service 40.

Next, a case will be described with reference to FIG. 23 in which, at a conference or the like that uses the electronic whiteboard 10, for example, voice of a speech of a participant or the like at the conference collected as contents of the conference is input. FIG. 23 is a sequence illustrating an exemplary process of inputting voice according to this embodiment. Note that step S2301 and step S2302 are substantially the same as step S1901 and step S1902 in FIG. 19, respectively, and therefore description thereof will be omitted.

The electronic whiteboard 10 according to this embodiment performs step S2303 through step S2309 every time voice is collected by the sound collecting device 19. Note that step S2303 is substantially the same as step S1903 in FIG. 19, and therefore description thereof will be omitted.

Following step S2304, the voice conversion processor 111 of the electronic whiteboard 10 converts voice data generated in step S2303 into text data (step S2304).

Subsequently, the display control 102 of the electronic whiteboard 10 displays a text represented by the text data obtained through conversion in step S2304 above (step S2305).

Subsequently, referring to confidential-word information stored in the confidential-word-information memory 114, the confidentiality determiner 113 of the electronic whiteboard 10 determines whether at least one of a confidential word and a similar word is included in the text represented by the text data (step S2306).

If it is determined in step S2306 that none of the confidential word and the similar word is included, the communicator 104 of the electronic whiteboard 10 transmits the text data to the decision-making assistance service 40 (step S2307). In response, the decision-making assistance service 40 transmits decision-making assistance data to the electronic whiteboard 10.

Upon reception of the decision-making assistance data via the communicator 104, the display control 102 of the electronic whiteboard 10 displays decision-making assistance information (step S2308).

On the other hand, if it is determined in step S2306 that at least one of the confidential word and the similar word is included, the display control 102 of the electronic whiteboard 10 displays the screen G500 for selecting suspension of transmission of contents of the conference, such as the screen illustrated in FIG. 18 (step S2309).

In the above manner, the electronic whiteboard 10 according to this embodiment converts voice data into text data and determines whether a text represented by the text data includes a confidential word or the like. Thus, the electronic whiteboard 10 according to this embodiment can transmit only text data including the confidential word or the like to the decision-making assistance service 40.

Although the above first to fourth embodiments have described exemplary cases in which handwritten characters and voice are input to the electronic whiteboard 10, the present invention is not limited to these cases. Each of the above embodiments is applicable to an apparatus other than the electronic whiteboard 10.

For example, each of the above embodiments is applicable to a scanner that generates image data by scanning a document. In this case, in the second embodiment above for example, before a scanner scans a document, a user can select whether image data is to be transmitted to the decision-making assistance service 40. In addition, in the fourth embodiment above for example, if image data generated by a scanner includes a confidential word or the like, a user can select whether the image data is to be transmitted to the decision-making assistance service 40.

Furthermore, for example, each of the above embodiments is applicable to a projector that projects an image based on image data. In this case, in the second embodiment above for example, a user can select whether image data of an image to be projected is to be transmitted to the decision-making assistance service 40. In addition, in the fourth embodiment above for example, if image data of an image to be projected includes a confidential word or the like, a user can select whether the image data is to be transmitted to the decision-making assistance service 40. More specifically, in this embodiment, text data is extracted from the image data to be projected, while the image data may be provided in the form of an electronic file, for example, from a terminal operated by the user.

Furthermore, for example, each of the above embodiments is applicable to a videoconference terminal that transmits and receives image data and voice data to and from another terminal. In this case, in the second embodiment above for example, a user can select whether image data and voice data to be transmitted and received to and from a plurality of terminals are to be transmitted to the decision-making assistance service 40. In addition, in the fourth embodiment above for example, if image data and voice data to be transmitted and received to and from a plurality of terminals include a confidential word or the like, a user can select whether the image data and voice data are to be transmitted to the decision-making assistance service 40. As described above, text data is extracted from the image data to be displayed, while the image data may be provided in the form of an electronic file, for example, from a terminal operated by the user. Alternatively, any writing made by the user, for example, on the electronic whiteboard 10 or any material (such as paper) on a table may be captured using a camera of the videoconference terminal, for display. In such case, the image data being displayed corresponds to data of a drawing made by the user on the electronic whiteboard 10 or any writing material.

In addition, although each of the above embodiments has described a case in which the electronic whiteboard 10 is connected to the decision-making assistance service 40 through the network N1, the present invention is not limited to this case. That is, for example, the decision-making assistance service 40 may be included in the conference assistance system 1.

Furthermore, for example, the electronic whiteboard 10 may have a function of implementing a service provided by the decision-making assistance service 40 (i.e., decision-making assistance function). In this case, the transmission permission determiner 108 of the electronic whiteboard 10 determines whether decision-making is to be assisted by implementing a decision-making assistance function by using text data representing voice data, handwritten-character data, or the like. In this case, the decision-making assistance function of the electronic whiteboard 10 generates assistance information based on the text data.

Further, in some embodiments, the conference assistance system includes a plurality of computing devices, e.g., a server cluster, that are configured to communicate with each other over any type of communications link, including a network, a shared memory, etc. to collectively perform the processes disclosed herein.

In any one of the above-described embodiments, the decision-making assistance service 40 for assisting a user to make a decision is used as a system that utilizes conference information that is obtained during the conference using an electronic apparatus, such as the electronic whiteboard 10, projector, videoconference terminal, etc. Alternatively, any service capable of assisting a user by providing conference-related information, may be used other than the decision-making assistance service 40. Examples of such service include, but not limited to, organization management service, operation planning service, reporting service, etc.

Further, contents of a conference, such as discussion or agenda, are not limited to the one described above. Examples of the contents of conference include, but not limited to, reporting, scheduling, brainstorming, problem or issue identifying, coaching one or more members related to a project, or any other type of conferences or meetings that are usually held to achieve a goal to be shared by multiple users, for example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An apparatus comprising:
   a network interface configured to communicate with a server through a network;
   one or more input devices configured to receive an input based on a voice or a writing of at least one meeting participant during a meeting; and
   processing circuitry configured to,
      selectively transmit data related to the input, via the network interface, to the server, in response to an indication that the data is transmittable,
      receive, via the network interface, assistance information associated with the data from the server, the assistance information including information relevant to the meeting, and
      control a display device to display the assistance information together with the data related to the input such that the assistance information displayed on the display device assists the at least one meeting participant.

2. The apparatus of claim 1, wherein the processing circuitry is configured to selectively transmit the data to the server based on a classification associated with the data.

3. The apparatus of claim 2, wherein the processing circuitry is configured to restrict a transmission of the data to the server in response to the data being confidential data.

4. The apparatus of claim 3, wherein the server is outside a local area network (LAN) associated with the apparatus, and the processing circuitry is configured to restrict the transmission of the data to the server located outside the LAN in response to the data being the confidential data.

5. The apparatus of claim 3, wherein the processing circuitry is configured to restrict the transmission of the confidential data based on whether a setting of the apparatus is set to restrict the transmission of the confidential data.

6. The apparatus of claim 5, wherein the apparatus is configured to receive a user input of the setting from a user of the apparatus to restrict the transmission of the confidential data.

7. The apparatus of claim 1, wherein
   the one or more input devices include an image capture device configured to capture an image of a medium containing the writing, and
   the processing circuitry is configured to, extract the writing from the image captured by the image capture device, and generate the data based on the writing extracted from the image.

8. The apparatus of claim 1, wherein the processing circuitry is configured to convert one or more of voice data representing the voice of the at least one meeting participant and writing data representing the writing of the at least one meeting participant to the data.

9. The apparatus of claim 1, wherein the information relevant to the meeting included in the assistance information is electronically gathered from extraneous sources.

10. The apparatus of claim 1, wherein the information relevant to the meeting is electronically gathered from extraneous sources using artificial intelligence.

11. A non-transitory computer readable medium storing computer readable code that, when executed by an apparatus, configures the apparatus to, receive, via one or more input devices, an input based on a voice or a writing of at least one meeting participant during a meeting;

selectively transmit, via a network interface, data related to the input to server in response to an indication that the data is transmittable;

receive, via the network interface, assistance information associated with the data from the server, the assistance information including information relevant to the meeting; and control a display device to display the assistance information together with the data related to the input such that the assistance information displayed on the display device assists the at least one meeting participant.

12. The non-transitory computer readable medium of claim 11, wherein the selectively transmitting includes selectively transmitting the data to the server based on a classification associated with the data.

13. The non-transitory computer readable medium of claim 12, wherein the selectively transmitting includes restricting a transmission of the data to the server in response to the data being confidential data.

14. The non-transitory computer readable medium of claim 13, wherein the server is outside a local area network (LAN) associated with the apparatus, and the selectively transmitting includes restricting the transmission of the data to the server located outside the LAN in response to the data being the confidential data.

15. The non-transitory computer readable medium of claim 13, wherein the selectively transmitting includes restricting the transmission of the confidential data based on whether a setting of the apparatus is set to restrict the transmission of the confidential data.

16. The non-transitory computer readable medium of claim 15, wherein the computer readable code, when executed by the apparatus, further configures the apparatus to, receive a user input of the setting from a user of the apparatus to restrict the transmission of the confidential data.

17. The non-transitory computer readable medium of claim 11, wherein the one or more input devices include an image capture device configured to capture an image of a medium containing the writing, and the computer readable code, when executed by the apparatus, further configures the apparatus to, extract the writing from the image captured by the image capture device; and generate the data based on the writing extracted from the image.

18. The non-transitory computer readable medium of claim 11, wherein the computer readable code, when executed by the apparatus, further configures the apparatus to, convert one or more of voice data representing the voice of the at least one meeting participant and writing data representing the writing of the at least one meeting participant to the data.

19. The non-transitory computer readable medium of claim 11, wherein the information relevant to the meeting included in the assistance information is electronically gathered from extraneous sources.

20. The non-transitory computer readable medium of claim 11, wherein the information relevant to the meeting is electronically gathered from extraneous sources using artificial intelligence.

* * * * *